Jan. 13, 1959

G. C. ELLERBECK 2,868,453

MECHANISM FOR THE ACCUMULATION OF PRODUCTS
AROUND A FIXED DECIMAL

Filed July 27, 1953

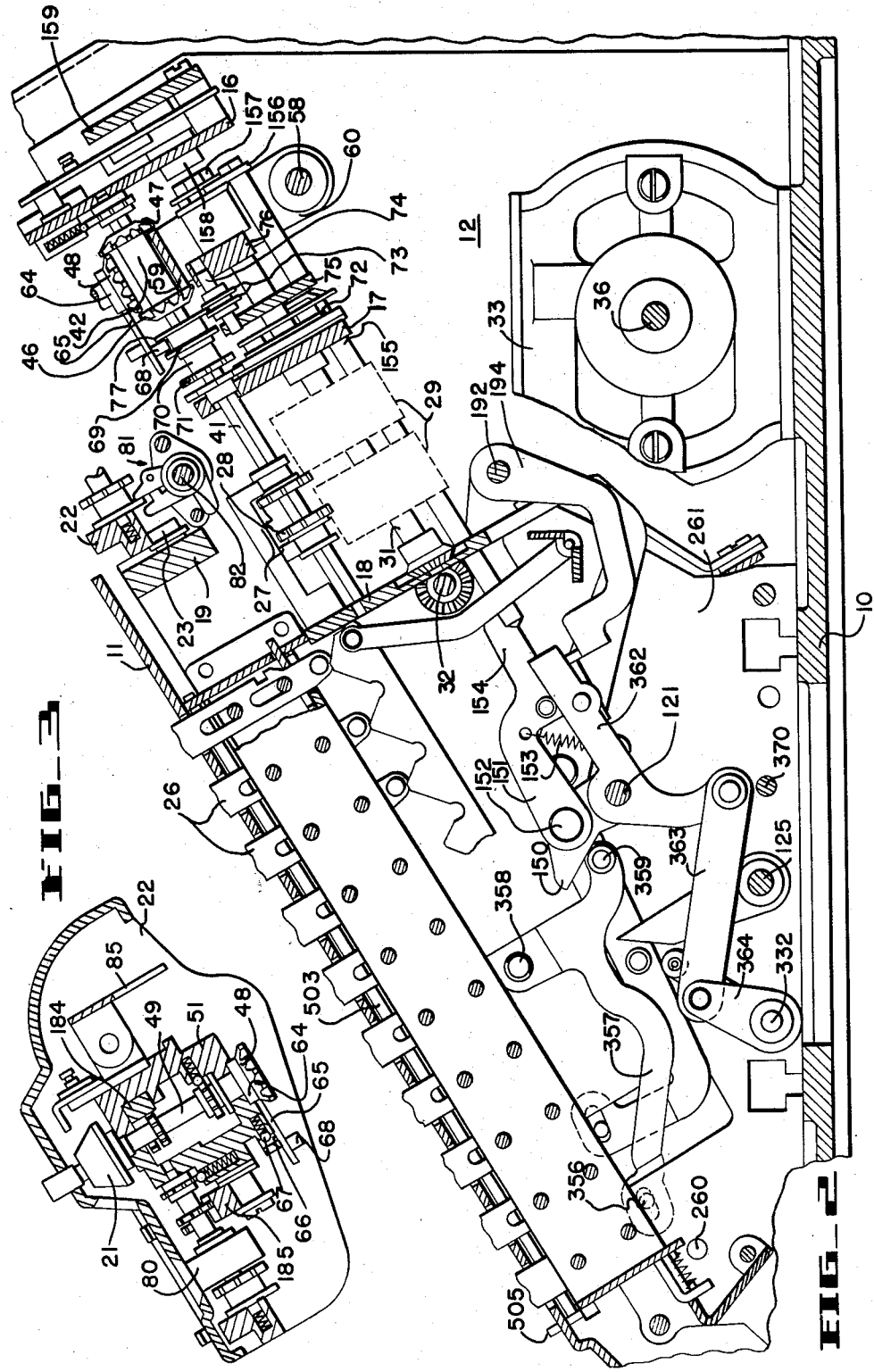

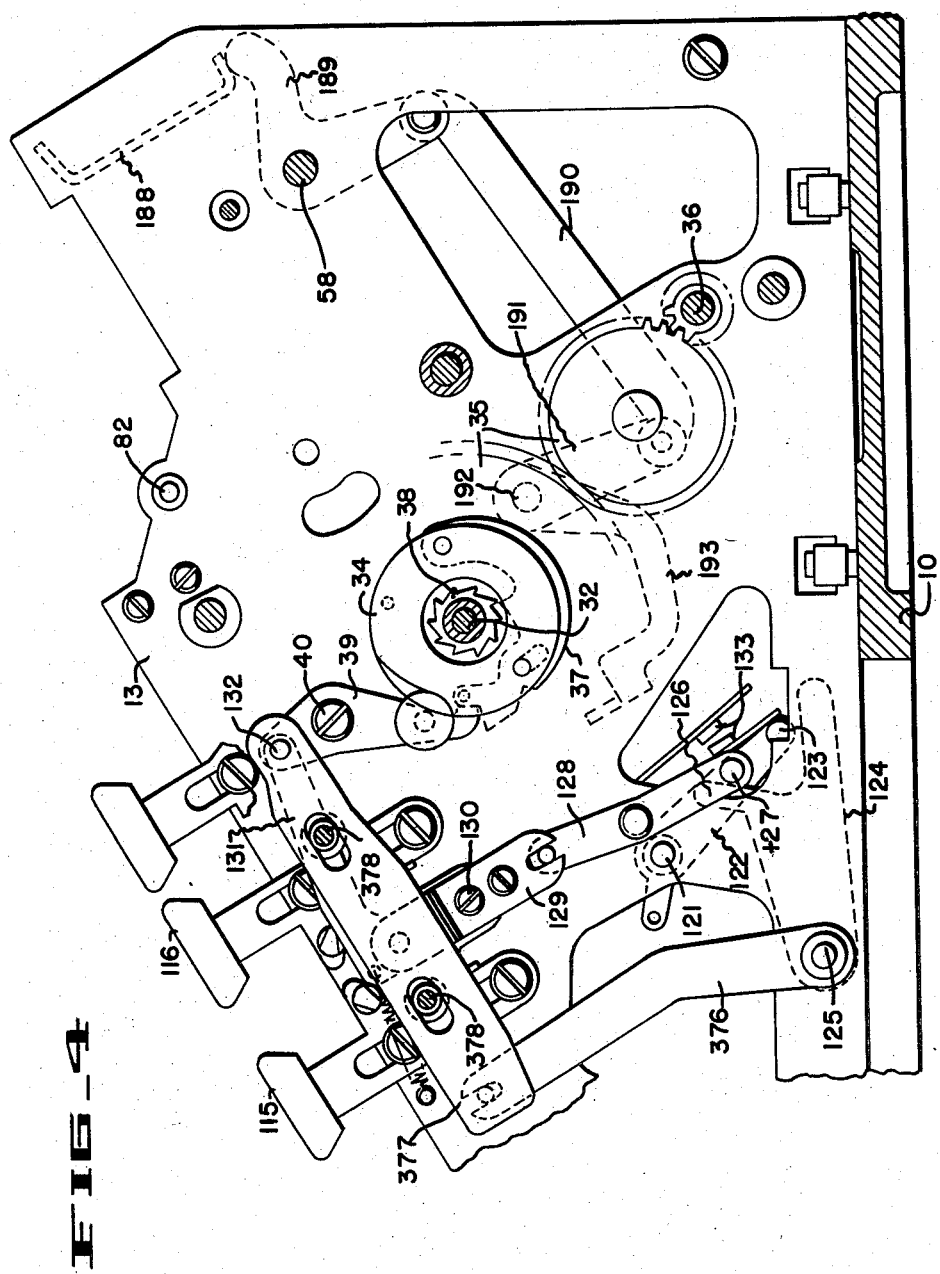

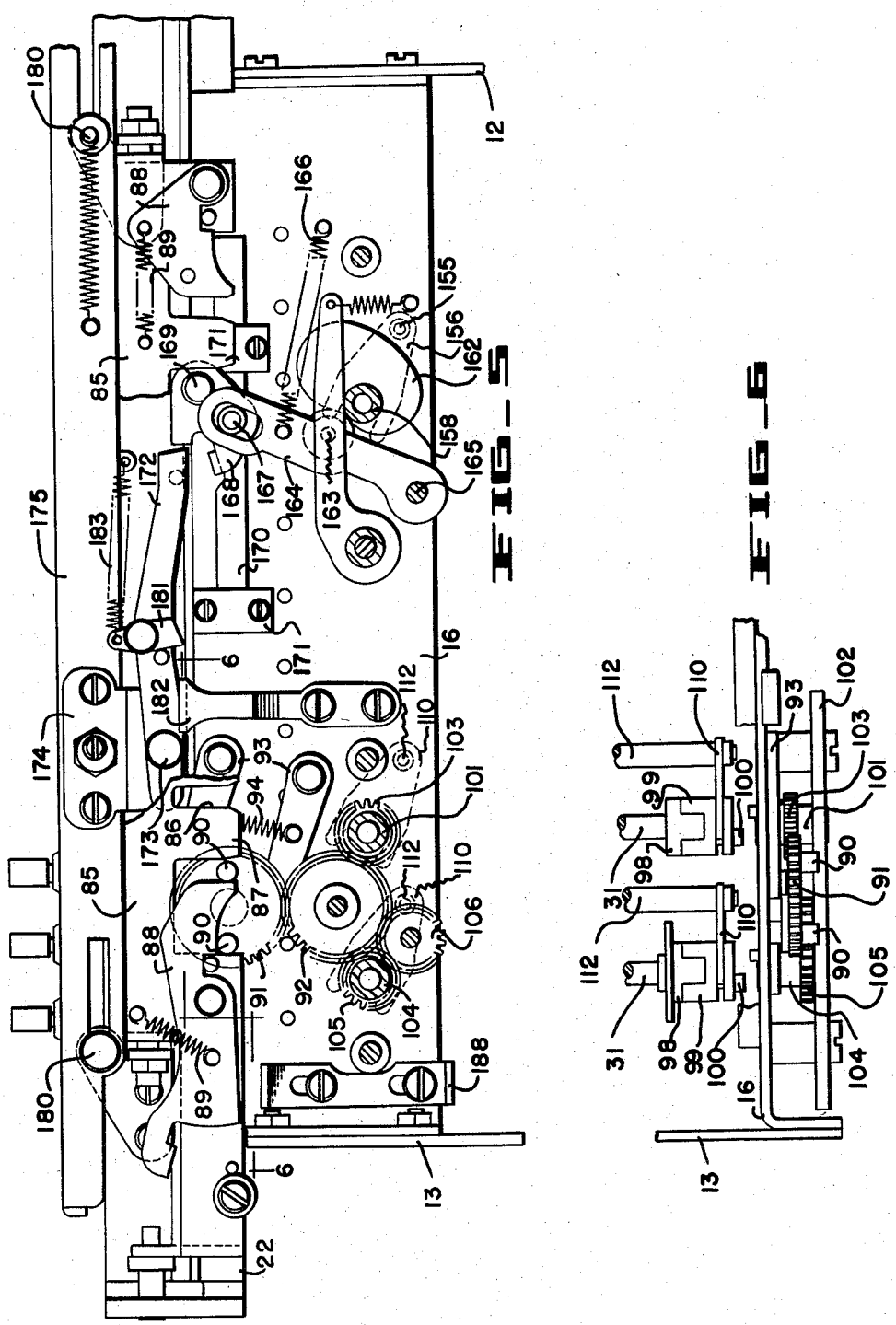

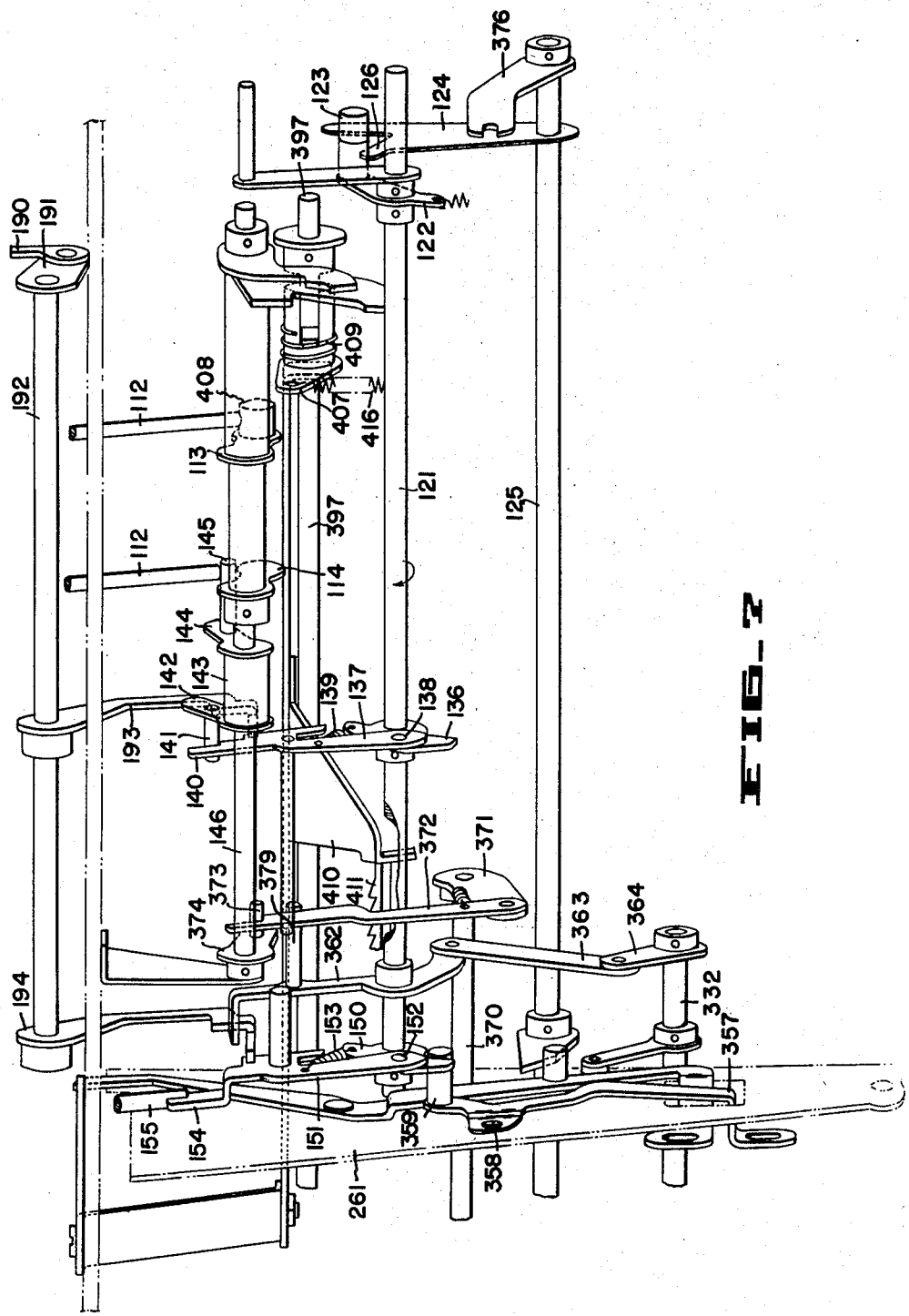

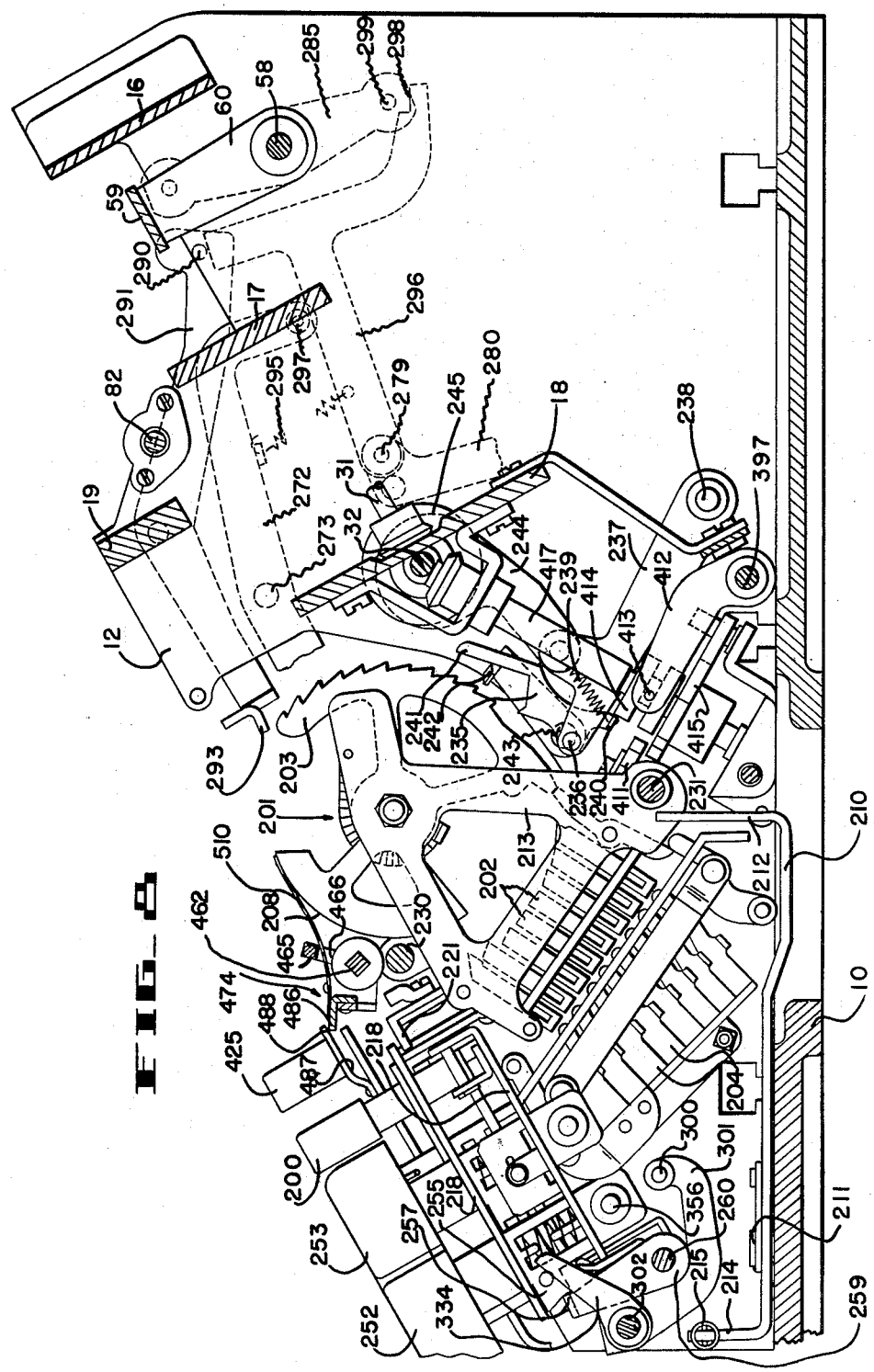

Jan. 13, 1959
G. C. ELLERBECK
2,868,453
MECHANISM FOR THE ACCUMULATION OF PRODUCTS
AROUND A FIXED DECIMAL
Filed July 27, 1953
11 Sheets-Sheet 7
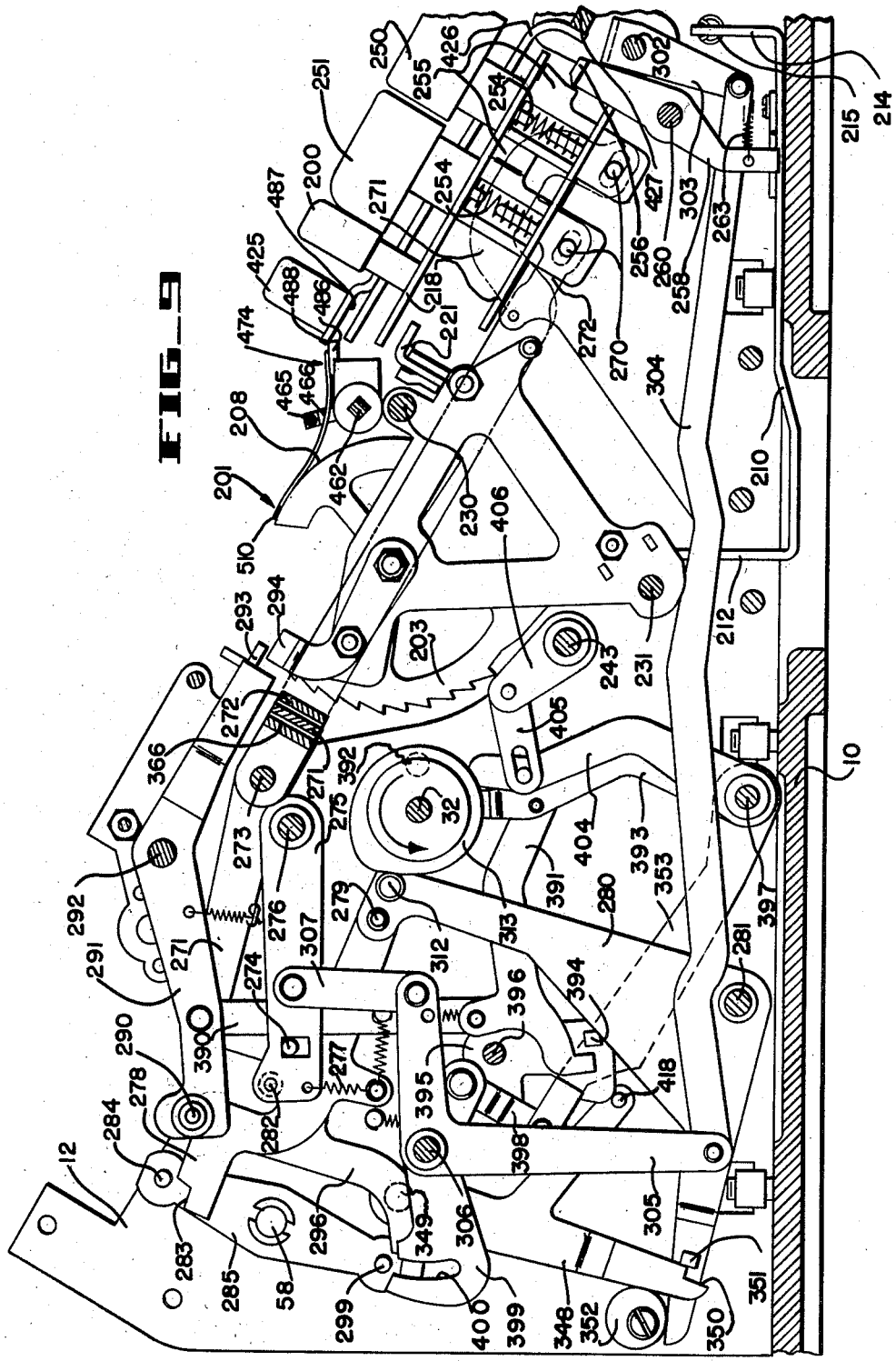
FIG_9

Jan. 13, 1959      G. C. ELLERBECK      2,868,453
MECHANISM FOR THE ACCUMULATION OF PRODUCTS
AROUND A FIXED DECIMAL
Filed July 27, 1953      11 Sheets-Sheet 8
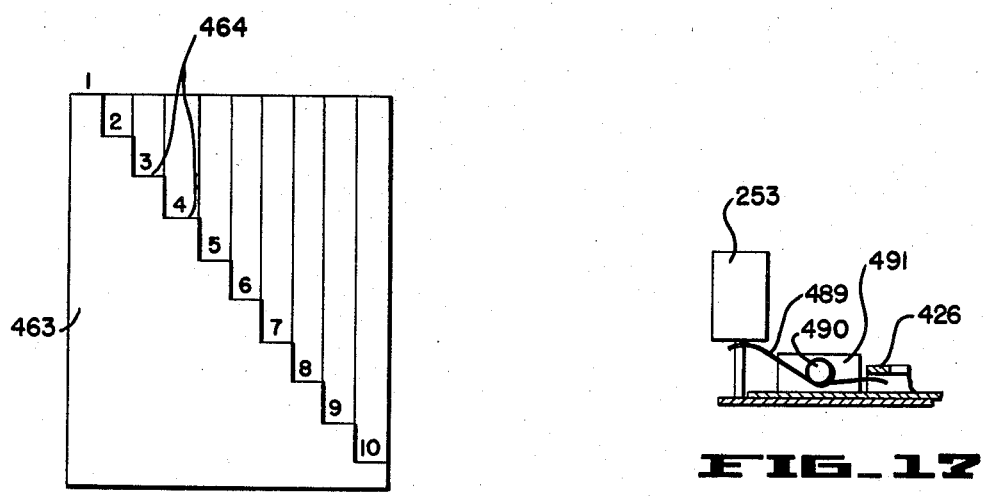
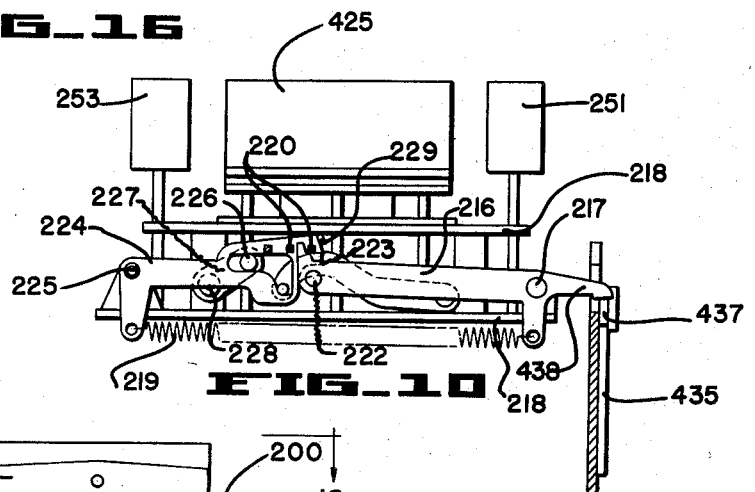
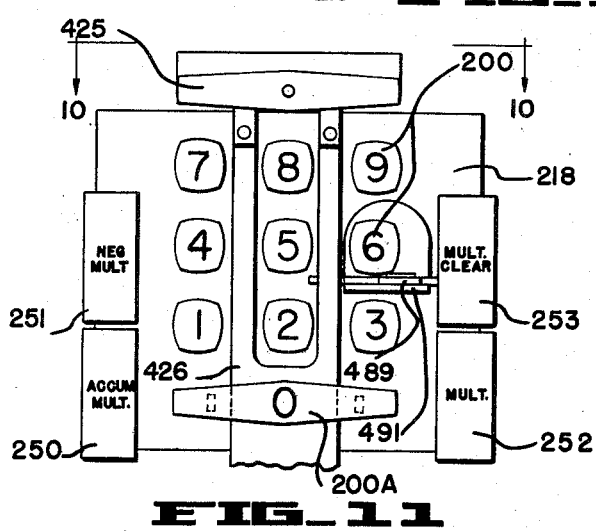

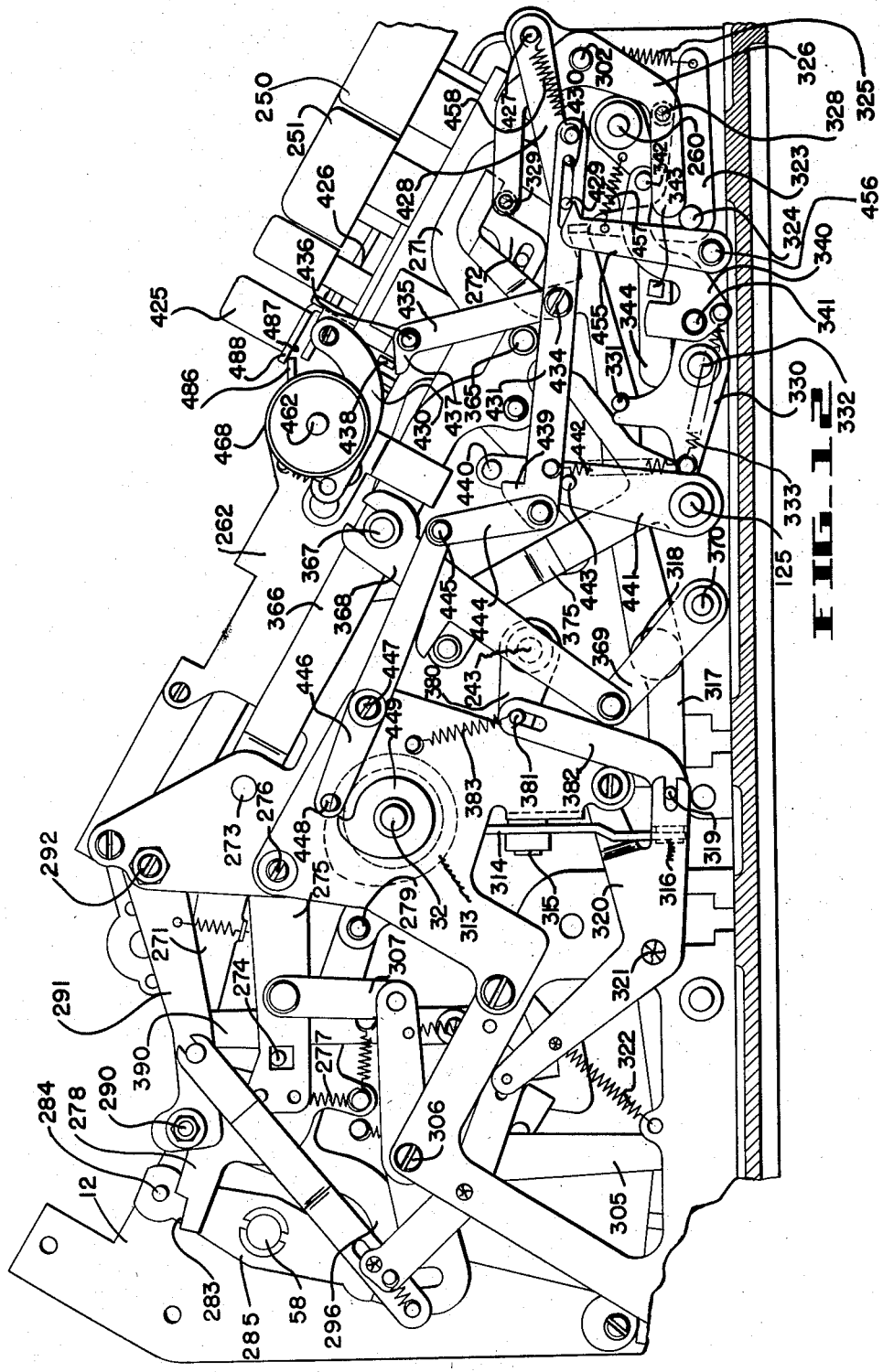

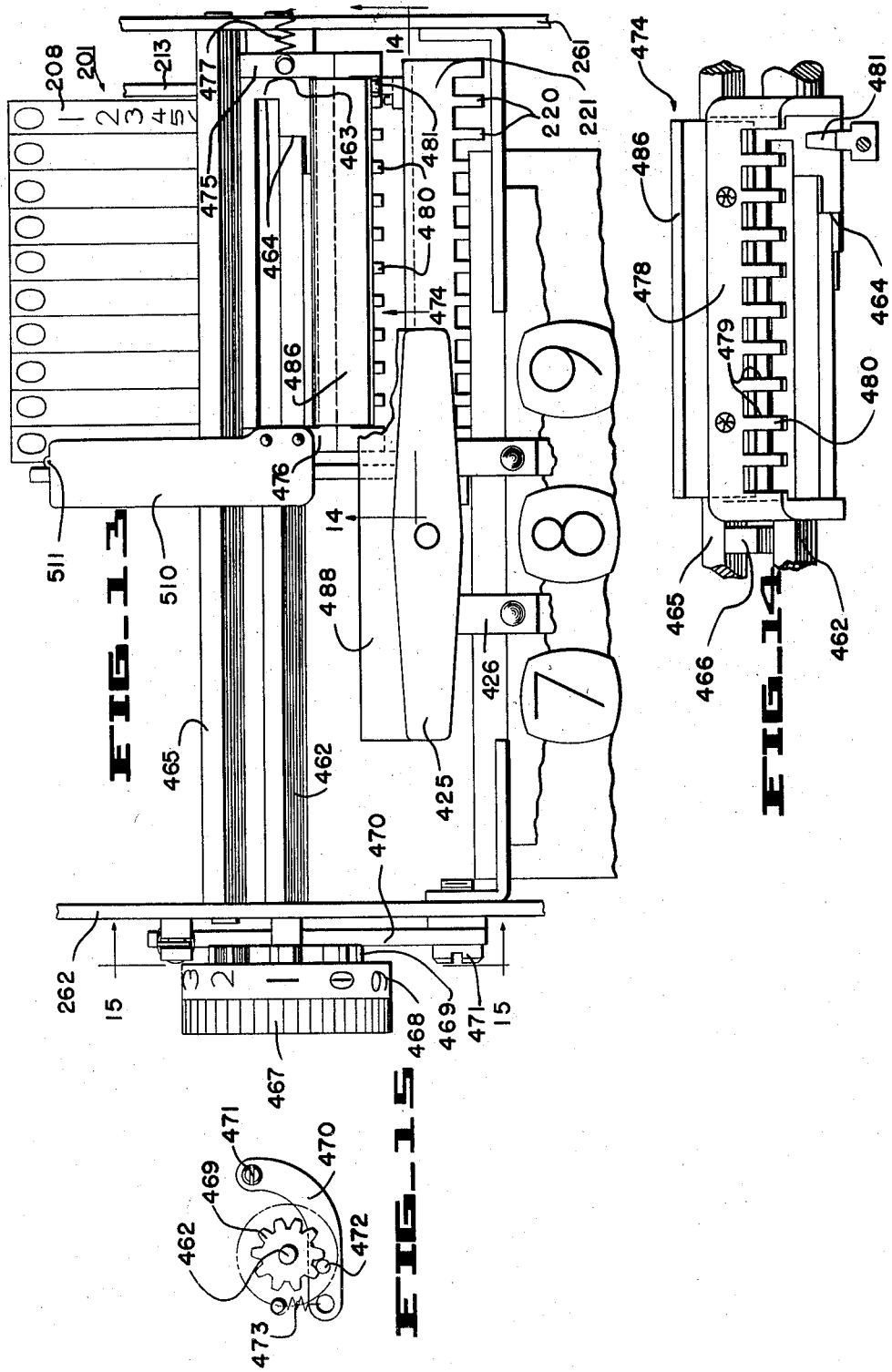

Jan. 13, 1959  G. C. ELLERBECK  2,868,453
MECHANISM FOR THE ACCUMULATION OF PRODUCTS
AROUND A FIXED DECIMAL
Filed July 27, 1953  11 Sheets-Sheet 11
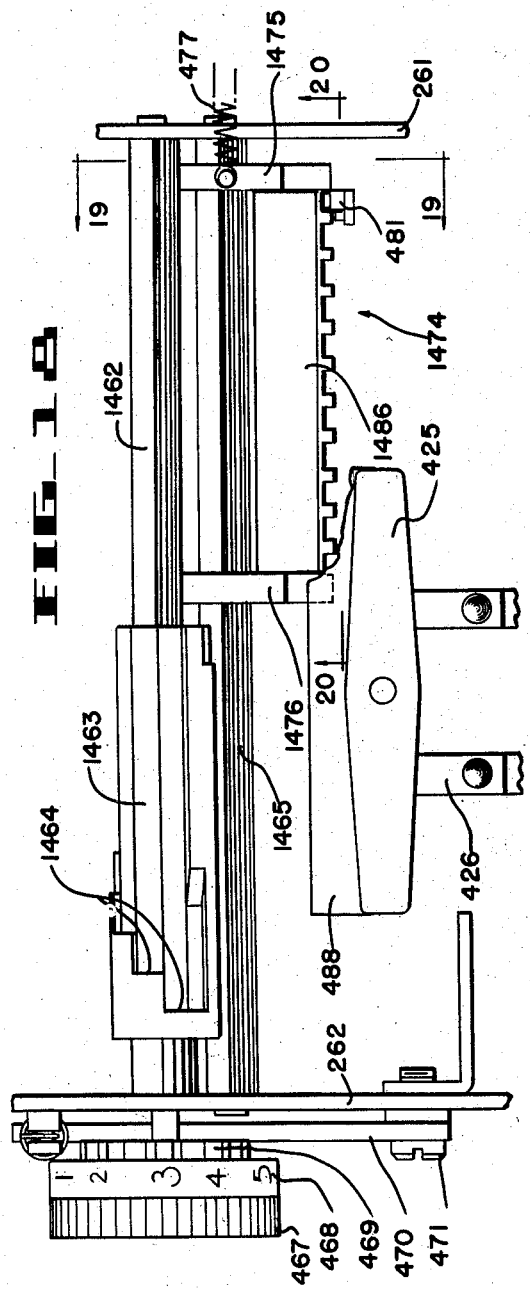
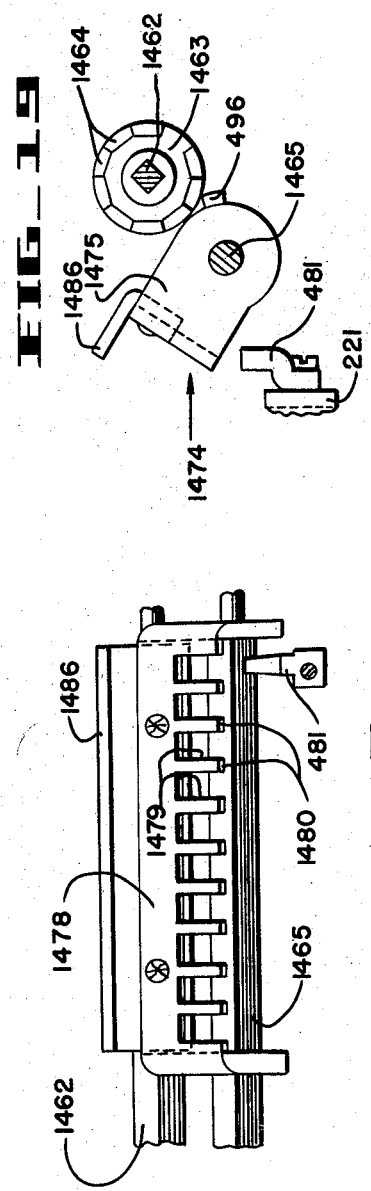

United States Patent Office 2,868,453
Patented Jan. 13, 1959

2,868,453

MECHANISM FOR THE ACCUMULATION OF PRODUCTS AROUND A FIXED DECIMAL

Grant C. Ellerbeck, San Leandro, Calif., assignor to Friden, Inc., a corporation of California Application July 27, 1953, Serial No. 370,332

12 Claims. (Cl. 235—63)

This invention relates to calculating machines and is concerned more particularly with the provision of improved means for performing plural order multiplication operations.

It is an object of the invention to provide an improved calculating machine in which plural order multiplying operations can be performed in an advantageous manner.

Another object of the invention is to provide an improved multiplication mechanism for simplifying certain calculator operations such as the computation of interest, amortization and the like.

Another object of the invention is to provide an improved calculating machine for performing automatic multiplication operations around a predetermined decimal position.

Another object of the invention is to provide an improved multiplication mechanism for the automatic registration and accumulation of decimalized products irrespective of the number of decimals in each factor.

A further object of the invention is to provide an improved calculating machine in which a plurality of zeros may be automatically entered into the multiplying mechanism upon manipulation of any one of a plurality of control keys.

Another object of the invention is to provide an improved multiplying mechanism for a calculating machine in which the decimal position in a plurality of products to be registered, singly or accumulatively, may be predetermined automatically.

Another object of the invention is to provide a calculating machine with an improved multiplying mechanism which is operable to control the automatic tabulation of a product register to any one of a plurality of predetermined positions.

A further object of the invention is to provide an improved calculating machine with means for predetermining the decimal point of each product of a plurality of products to be registered for positive or negative accumulation in a register and for automatically tabulating the register to a preselected position for the registration of each such product.

Other objects and advantages will be apparent from the following description of a preferred embodiment of the invention as illustrated in the accompanying drawings, in which:

Fig. 2 is a sectional elevational view of the machine taken on the line 2—2 of Fig. 1 and with the carriage removed.

Fig. 3 is a sectional elevational view of the carriage.

Fig. 4 is a fragmentary elevational view of the right side frame plate with certain mechanisms removed for clarity, the view being taken on line 4—4 of Fig. 1.

Fig. 5 is an elevational view of the machine as viewed from the rear.

Fig. 6 is a plan view of the right and left carriage shift clutches as indicated by line 6—6 of Fig. 5.

Fig. 7 is a perspective view of a portion of the control linkage utilized in the shifting, resetting, and multiplying operations.

Fig. 8 is a sectional elevation of a portion of the multiplier control mechanism.

Fig. 9 is a sectional elevational view of the multiplier control mechanism as seen from the left.

Fig. 10 is an elevational view of the rear portion of the multiplier keyboard showing the escapement mechanism and indicated by line 10—10 in Fig. 11.

Fig. 11 is a plan view of the multiplier keyboard.

Fig. 12 is a left side elevational view of the machine with the cover removed as indicated by line 12—12 in Fig. 1.

Fig. 13 is an enlarged plan view of the multiplier pin carriage and the multiple zero mechanism related thereto.

Fig. 14 is an enlarged elevational view of the multiple zero bail and cam for control by the pin carriage, the view being taken on line 14—14 of Fig. 13.

Fig. 15 is the detent means for the dial and cam shown in Fig. 13, the view being indicated by line 15—15 of Fig. 13.

Fig. 16 is a developed view of the stepped cam shown in Fig. 13.

Fig. 17 is a view of the auxiliary control key release means operable by the multiplier correction key.

Fig. 18 shows a modification of the mechanism shown in Fig. 13.

Fig. 19 is a sectional elevational view of the modification of the multiple zero cam and bail as indicated by line 19—19 of Fig. 18.

Fig. 20 is an elevational view of the multiple zero bail disengaged from the multiplier pin carriage frame as indicated by line 30—30 of Fig. 18.

Figure 1:
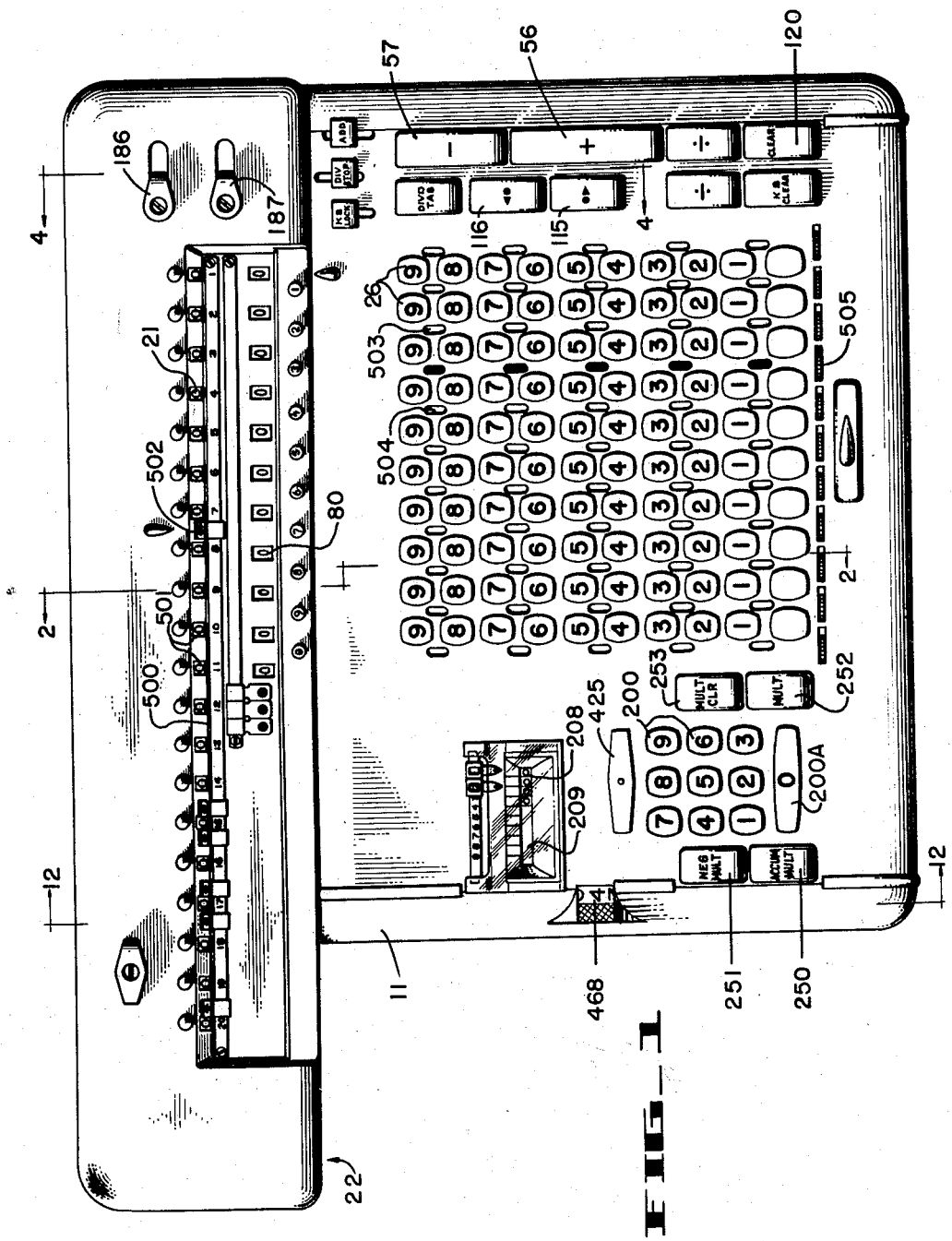
Fig. 1 is a plan view of the covered machine.

The invention is described in a preferred form as adapted to a Thomas type calculating machine such as that disclosed in the patent to Friden No. 2,229,889 and incorporating the mechanism of Patent No. 2,371,752 issued to Friden, March 20, 1945 and the improved mechanism of Patent No. 2,399,917 issued to Carl M. Friden et al., May 7, 1946.

In automatic multiplication operations wherein one or both factors have a decimalized fraction and in which the product is to be registered in a selected decimal position in the register, it has been necessary heretofore to count the decimal places in the multiplicand and/or the multiplier and enter each in the machine accordingly. For example, if the desired decimal place is the tenth position in the register, that is, between the tenth and eleventh dials, and the multiplicand has three decimal places therein and the multiplier has none, the operator first sets the multiplicand in the right side of the keyboard and the multiplier in the multiplier keyboard. The entry of the multiplier is effected by entering the whole number followed by the entry of seven zeros. Similarly, in using the same decimalized multiplicand and a multiplier having four decimal places, the multiplier is entered into the multiplier mechanism followed by three zeros.

When desired to accumulate the products of factors having a varying number of decimal places therein, the decimal position in the register becomes critical and with each operation the operator determines the number of zeros to be added into the multiplier mechanism complementing the decimal places in the multiplicand in the keyboard. Therefore, the "setting up" of the factors for each multiplication operation is the time consuming responsibility of the operator. In the machine to be hereinafter described this responsibility becomes a matter-of-course operation since the operator has but to enter the factors around established decimal points just as he reads them and each product is registered in its proper decimal position in the register.

General description

The machine includes base 10 (Fig. 2) which supports casing 11 (Figs. 1 and 2) and has side frame members 12, 13 mounted thereon. Side frame members 12, 13 (Figs. 2 and 4) are connected by various crossframe members 16, 17, 18 and 19 (Fig. 2) which serve to mount various mechanisms referred to hereinafter. The accumulator register comprises a series of reversible numeral wheels 21 (Figs. 1 and 3) in register carriage 22 mounted on crossframe members 16 and 19 by rollers 23 for endwise shifting movement laterally of the machine in either direction to various ordinal positions. The values to be introduced in the numeral wheels 21 are selected by means of a plurality of banks or orders of settable value keys 26, one of which banks is illustrated in part in Fig. 2. Each bank of keys 26 cooperates with selecting mechanism including a pair of spring-urged slides 27 mounted for endwise movement to position the associated pair of gears 28 selectively with respect to the conventional stepped teeth on the associated actuating cylinder 29 shown in phantom in Fig. 2, each such slide being positioned in accordance with the value of the depressed key. Cylinders 29 (Fig. 2) are mounted on actuating shafts 31 having suitable bevel gear connections with transverse shaft 32 which is suitably journalled in side members 12, 13. Each shaft 31 serves two orders of the machine and has a pair of similar cylinders 29 mounted thereon. Shaft 32 and shafts 31 are driven cyclically from motor 33 through a clutch 34 (Fig. 4) which is driven by suitable gearing 35 from motor shaft 36. As explained in the afore-mentioned Patent No. 2,229,889, clutch 34 is engaged or disengaged by oscillation of spring-urged clutch pawl or dog 37 mounted for rotation with shaft 32 with respect to ratchet 38 journalled on shaft 32 and driven by gearing 35. Clutch control lever 39, pivoted on side member 13, determines engagement or disengagement of the clutch by releasing or engaging clutch dog 37 in the full-cycle position thereof.

From the above description it is seen that the values set in the machine by depression of keys 26 will be introduced into numeral wheels 21 by the cooperation of gears 28 with cylindrers 29 during cyclic operation of the clutch. Each pair of gears 28 is slidably mounted on a square shaft 41 (Fig. 2) supported in cross members 17, 18 and extending rearwardly of the machine through cross member 17 and having its rear end journalled in cross member 16. Intermediate members 16, 17, a spool 42 is slidably and nonrotatably mounted on each shaft 41 and has opposite bevel gears 46, 47 at its ends positioned for cooperation with numeral wheel gear 48 (Figs. 2 and 3) mounted at the lower end of numeral wheel shaft 49 journalled in frame 51 of carriage 22. Therefore when one set of gears 46, 47 is engaged with gears 48, numeral wheels 21 will be rotated forwardly or reversely to register a number of increments equal to the value of the depressed key 26 in the aligned banks of keys.

Plus and minus keys

Means are provided for selectively determining positive or negative registration on the numeral wheels 21 in the form of plus key 56 (Fig. 1) and minus key 57 which are slidably mounted in the machine. The plus and minus keys are adapted to control positive and negative registration in the accumulator and for this purpose they may be connected by suitable mechanism not disclosed herein to effect rocking of the shaft 58 (Fig. 2). A gate 59 extends transversely of the machine between plus-minus gears 46, 47 for the control thereof and is supported by two similar arms 60 secured on shaft 58 for rocking movement therewith. Thus, the depression of the plus key 56 serves to rock shaft 58, clockwise as seen in Fig. 2, to mesh gears 46 with numeral wheel gears 48, and the depression of the minus key 57 serves to rock shaft 58 counter-clockwise, thereby meshing gears 47 with the numeral wheel shaft gears 48. The plus and minus keys also serve to engage the clutch and motor circuit by suitable means. This mechanism may be of the type disclosed in said Patent No. 2,229,889.

Accumulator transfer mechanism

Means are provided for carrying from one order to the next higher order in the accumulator register when the registration of a numeral wheel changes from "0" to "9" or vice versa. For this purpose each numeral wheel shaft 49 (Figs. 2 and 3) carries a single tooth gear 64 immediately beneath frame 51 in operative relation with transfer lever 65 pivoted at 66 on frame 51. Lever 65 is mounted in frame 51 by spring-pressed ball 67 engaging a suitable notch in pivot 66. Each lever 65 extends into the next higher order of the machine and carries a pin 68 which extends downwardly in operative relation with a flange 69 (Fig. 2) on collar 70. Gear 71 on collar 70 is normally disposed out of the path of the single tooth actuator 72 on shaft 31. When numeral wheel 21 of one order passes from "9" to "0" or vice versa, single tooth gear 64 rocks lever 65, which, through pin 68, moves collar 70 to position gear 71 of the next higher order in the path of the associated transfer actuator 72. Thus, the transferred increment is introduced through either gear 46 or 47 of the next higher order depending upon setting of the machine for addition or subtraction. Transfer gear 71 is maintained resiliently in either adjusted position thereof by the engagement of the flange 77 of collar 70 between spaced flanges 73 on stub shaft 74 slidably mounted in cross members 75, 76 and engaged by a suitable spring-pressed ball (not shown). Suitable restoring means is provided for the shiftable transfer mechanism in association with transfer actuator 72 as is fully disclosed in the afore-mentioned Patent No. 2,229,889.

Revolutions counter

A revolutions counter is also provided to register positively or negatively the number of actuations of the accumulator numeral wheels 21 (Figs. 2 and 3). Revolutions counter numeral wheels 80 are suitably journalled in carriage 22 and are actuated by an actuator 81 on shaft 82 to register the number of positive and negative registrations on numeral wheels 80 as is fully disclosed in the said patent.

Carriage shift mechanism

Means are provided for shifting the carriage in either direction from one ordinal position to another by power-driven means controlled by manually operable keys. The power-driven means includes a part of the actuating means for entering values into the accumulator register. Carriage 22 (Figs. 3 and 5) has plate 85 suitably mounted along the rear thereof which is provided with vertical slots 86 formed by teeth 87. End slots 86 are formed in part by similar yieldable pawls 88 as shown in Fig. 5 and which are urged into active position by springs 89. Slots 86 are adapted for engagement by opposite shift pins 90 on shift gear 91 which is suitably journalled on crossframe member 16. Shift gear 91 is rotated selectively in either direction through idler gear 92 to shift the carriage through any desired number of ordinal spaces by the cooperation of pins 90 and teeth 87. Shift gear 91 is centralized by means of centralizer arms 93 having spring 94 connected therebetween.

In order to rotate shift gear 91 selectively in either direction the two right-hand actuating shafts 31, similar to shaft 31 as seen in Fig. 2, are extended and are provided with similar controllable drive connections with gear 91 (Figs. 5 and 6). Each connection includes a collar 98 fixed on the associated shaft 31 adjacent the end thereof and having diametrically opposed teeth for sliding engagement with slots of the shiftable collar 99 which is mounted for sliding movement at the end of shaft 31. Collar 99 has smaller teeth 100 in operative relation with corresponding slots in gear sleeve 101. Gear sleeve 101 is suitably journalled in cross-member 16 and plate 102 and carries gear 103 (Fig. 5) meshing with idler gear 92. Similar gear sleeve 104 has gear 105 which meshes with a wide gear 106, also in operative relation with idler gear 92. Thus by selective shifting of collars 99 to establish a drive connection, rotation of actuating shafts 31 determines rotation of shift gear 91 in either direction and correspondingly shifting of the carriage 22 in either direction. Similar mechanisms are provided to control shifting of collars 99. Each mechanism includes a fork 110 (Fig. 6) at the rear end of similar rods 112 and engaging the associated collar 99. Rods 112 are slidably mounted in cross-members 17, 18 and are urged to the position shown by springs (not shown). Rods 112 (Fig. 7) have associated therewith respective arms 113 and 114 which are oscillated to shift rods 112 by means including shift keys 115, 116 (Figs. 1 and 4) mounted for endwise movement on side member 13 and also suitably connected to engage clutch 34 and close the motor circuit. Thus, carriage 22 carrying numeral wheels 21, can be shifted selectively in either direction by depression of keys 115, 116. The foregoing mechanism is of the general type disclosed in the patent to Carl M. Friden No. 2,294,083 which issued August 25, 1942.

*Resetting mechanism*

Means are provided for restoring the machine to normal condition between successive operations by shifting the carriage to a predetermined position and by then effecting zero resetting of either the accumulator or the revolutions counter, or both of these registers as determined by settable control means, the operation being carried out by power-driven means under control of a manually operable register return and resetting key. This mechanism is of the general type disclosed in the patent to Carl M. Friden No. 2,294,083 which issued August 25, 1942.

Return and resetting key 120 (Fig. 1) is operative, upon depression thereof, to establish a drive connection between the power-driven resetting mechanism and the actuating means and to initiate a carriage shifting and register resetting operation. Key 120 is mounted in a suitable manner on a side frame in the machine for substantial endwise movement and is suitably connected to effect a rocking movement of shaft 121 (Figs. 2, 4 and 7) upon depression of the key.

To engage the drive, shaft 121 has depending arm 122 (Figs. 4 and 7) carrying a pin 123 engaging arm 124 pivoted on shaft 125. Arm 124 has finger 126 engaging a pin 127 in the lower end of a lever 128. Pin 127 serves, upon rocking of lever 128, to close motor contacts 133. Lever 128 is connected at its upper end by a pin engaging a slot of lever 129 pivoted at 130 on side frame 13. Lever 129 is connected at its upper end with a link 131 which is pivotally connected to the clutch engaging pawl 39 by a pin 132 so that rocking movement of the shaft 121 serves to rock lever 128 counter-clockwise and lever 129 clockwise to engage the clutch and close the motor contacts. Before the drive begins key 120 also controls the engagement of the shift and resetting drive connections.

To initiate the carriage return determined by depression of key 120, shaft 121 carries arm 136 (Fig. 7) having pusher link 137 pivoted thereon at 138 and urged downwardly by a spring 139. Spring 139 urges notched end 140 of link 137 into engagement with pin 141 carried by arm 142 secured on one end of sleeve 143 which is rotatable on shaft 146. At its other end and integral with arm 142, the sleeve 143 carries depending arm 144 which has a pin 145 abutting the forward end of left shift push rod 112 for control thereof. Thus, rocking movement of shaft 121 in the direction of the arrow in Fig. 7, serves to operate left shift push rod 112 to establish the shift drive connection for left-hand shifting of the carriage.

The rocking of shaft 121 upon depression of key 120 also serves to enable the drive connection from the actuating means to the resetting drive means mounted on the frame of the machine. For this purpose shaft 121 (Figs. 2 and 7), which is rocked upon depression of key 120, carries arm 150 having pusher link 151 pivoted thereon at 152 and urged by spring 153 to engage its notched end 154 with rod 155 slidably mounted in brackets 17 and 18 and normally positioned, as shown in Fig. 2, by a suitable spring (not shown). Pusher link 151 and arm 150 are similar to link 137 and arm 136, respectively. At its rearward end rod 155 (Figs. 2 and 5) carries fork 156 operatively engaged with shiftable toothed collar 157 similar to collars 99 of the shift mechanism and similarly mounted on one of actuating shafts 31. The teeth of collar 157 are engageable with the slotted end of sleeve 158 suitably journalled in bracket 16 and plate 159 secured thereon. Sleeve 158 (Fig. 5) carries cam 162 which is engaged by roller 163 on arm 164 pivoted at 165 on bracket 16 and urged toward cam 162 by spring 166. The upper end of arm 164 is slotted to engage roller 167 suitably journalled on pawl 168 pivoted at 169 on slide 170 mounted for endwise movement on bracket 16 by small brackets 171. As illustrated in Fig. 5, when the carriage 22 is in its left position (to the right in this figure) pawl 168 is in operative relation with arm 172 pivoted at 173 on bracket 174 depending from a resetting drive member comprising slide 175. Slide 175 has an L-shaped cross section and is mounted for endwise sliding movement on carriage 22 by spaced studs 180. As described later, reciprocation of slide 175 can be utilized to reset either or both of the registers. Arm 172 has "live" one-way acting pawl 181 pivoted thereon intermediate its ends to cooperate with fixed ledge 182 mounted on bracket 16 to lift arm 172 out of the path of pawl 168 during movement of the carriage into its end position. Spring 183 urges arm 172 to the position shown against a suitable stop on the carriage frame. With the parts positioned as illustrated in Fig. 5 it is seen that upon movement of slide 170 to the left, lateral pawl 168 will engage the end of arm 172 to reciprocate resetting drive slide 175. The reciprocation of slide 175 is effected in the first cycle during which the carriage is in the end position shown in Fig. 5.

Slide 175 may be operatively related to either or both or resetting rack bars 184 and 185 of the accumulator and counter, respectively (Fig. 3) by the adjustment of settable control means to adjust the connections therebetween. For this purpose a predetermined angular counter-clockwise rotation of resetting knob 186 (Fig. 1) serves to disable the operation of resetting rack 184 by slide 175. Likewise, a similar counter-clockwise rotation of resetting knob 187 disables the control of the counter resetting rack 185 by the slide 175. Thus, it can be seen that by selective manipulation of the conventional knobs 186, 187 operation of either or both of rack bars 184, 185 by slide 175 can be predetermined so that the accumulator and the revolutions counter or either of them will be reset to zero upon depression of key 120.

Key 120 may be latched in depressed position during shifting of the carriage to its end position if displaced therefrom and the latch may be released during the first cycle of operation of the actuating means when in said end position as disclosed in said Patent No. 2,294,083 under control of override pawl 88 (Fig. 5).

Override pawl 88 also serves to interrupt operation of the shift and resetting drive connections after the first cycle (resetting cycle) following the shifting operation. For this purpose slide 188 (Figs. 4, 5 and 7) is mounted for endwise movement on bracket 16 for operation by pawl 88 upon oscillation thereof by shift pins 90. Slide 188 overlies an arm of bellcrank 189 pivoted on shaft 58 journalled in plate 13 and pivotally connected to link 190 which is also pivotally connected to arm 191 depending from shaft 192 suitably mounted on the frame. Shaft 192 carries arms 193, 194 underlying pusher links 137 and 151, respectively.

Thus, upon rocking movement of override pawl 88 during the resetting cycle, the above-described linkage operates through arms 193 and 194 (Fig. 7) to lift pusher links 137 and 151 which results in release of left shift push rod 112 and resetting push rod 155, respectively, causing disengagement of the shift and resetting drive connections.

*Multiplier keyboard*

The selection mechanism for the multiplier factor is of the type disclosed in the aforementioned Patents Nos. 2,371,752 and 2,399,917. Generally, such mechanism comprises a ten-key keyboard including keys 200 (Figs. 1 and 8) and a pin carriage 201 associated therewith having ten ordinal rows of settable stop pins 202 and ten ordinal differentially adjustable elements 203 in the form of racks in which digits of the multiplier may be set successively for subsequent control of the multiplying operation. In order to set up the multiplier digits each pin row includes eight pins corresponding to "1" to "8" keys and a fixed stop corresponding to the "9" key so that a depressed multiplier key operates through an associated selection lever 204 to set the corresponding pin of an aligned ordinal row to active or raised position. At the same time that a pin of the pin carriage is moved to active position the aligned rack is released to move into engagement with the pin and thereby be set differentially in accordance with the value of the depressed key. Subsequently, the depressed key operates an escapement mechanism to be described hereinafter to move the pin carriage one ordinal step to the left as viewed in Fig. 1 with respect to the keyboard selection mechanism.

In this manner the multiplier digits are set up in the multiplier selection mechanism, the "setting-up" operation beginning with the highest order digit of the multiplier in the embodiment illustrated. As shown in Fig. 1, a setting has been made corresponding to four successive depressions of the "0" key 200A.

*Multiplier carriage escapement mechanism*

As previously explained, the pin carriage is movable step by step transversely of the machine in accordance with the number of multiplied digits entered. The pin carriage is normally in its right end position (Figs 1 and 13) as viewed from the front of the machine, with indicating sectors 208 to the right of, and not visible through, sight opening 209 (Fig. 1). The condition shown in Fig. 1 would obtain after four successive depressions of "0" key 200A, or by mechanism to be hereinafter described, to move the pin carriage to the left so that all sectors 208 are in value-displaying position. The pin carriage is spring urged toward its left end position by means of horizontally disposed bellcrank 210 (Fig. 8) which is pivoted at 211 on machine base 10 by means of an adjustable eccentric and has an upstanding arm 212 engaging right side plate 213 of the pin carriage 201. Another arm 214 of bellcrank 210 has a spring 215 secured thereto and extending longitudinally across the front of the machine, whereby the bellcrank is urged in a counter-clockwise direction as viewed from the top in Fig. 8, correspondingly the pin carriage is urged from its right end position which it occupies when no multiplier value is set in the machine.

Normally, the movement of the pin carriage under the influence of spring-urged bellcrank 210 is prevented by means of stop pawl 216 (Fig. 10) pivoted at 217 on an upstanding ear of lower keyboard plate 218 with the nose of pawl 216 being urged upwardly into active engagement with a tooth 220 of the carriage escapement rack 221 (Figs. 8, 9, 10 and 13). Pawl 216 carries pin 222 (Fig. 10) underlying a tooth 223 of a pawl arm 224 pivoted at 225 on an upstanding ear of the lower keyboard plate 218. Pawl arm 224 is slotted longitudinally to receive pin 226 carried by arm 227 on rod 228 journalled in similar spaced ears of lower keyboard plate 218. Pawl arm 224 also carries laterally projecting tooth 229 which is normally urged by spring 219 to a position immediately above teeth 220, as seen in Fig. 10, and is disposed for downward movement between the pair of teeth adjacent and to the right of that contacted by the nose of pawl 216.

Preferably the escapement shift is performed in two stages. One stage occurring during depression of a multiplier key and the last stage occurring just before return of the key to raised position. When a multiplier key is depressed, shaft 228 is rocked by conventional means whereby arm 227 and pin 226 serve to rock pawl arm 224 about its pivot in a clockwise direction, thereby simultaneously lowering the tooth 223 and tooth 229 thereof into active position with respect to teeth 220 of the escapement rack 221. The engaging edge of the tooth 223 is spaced sufficiently above the pin 222 of stop pawl 216 to enable the setting of the associated pin 202 (Fig. 8) and release of the corresponding segmental rack 203 with a partial depression of a multiplier key 200. Upon further depression of the key 200 the tooth 223 engages the pin 222 of pawl 216 to rock pawl 216, counter-clockwise as viewed in Fig. 10. It will be noted that the nose of pawl 216 is of sufficient length to remain in engagement with a tooth 220 until tooth 229 is moved into alignment with the adjacent tooth 220. As soon as the nose of the pawl 216 is disengaged from a tooth 220, the first stage of the shift step occurs and the pin carriage moves to the right, as viewed in Fig. 10, under the influence of the bellcrank 210 and the spring pressure thereon until a rack tooth 220 engages tooth 229 of pawl arm 224 upon full depression of the multiplier key. The movement of the pin carriage during this stage of a shift step corresponds to the space between the tooth 229 and the normal position of the rack tooth 220 adjacent thereto, the movement being sufficient to position the previously active tooth 220 over the nose of pawl 216, but insufficient to allow engagement of the projected finger 204 (Fig. 8) with the next pin row to become active. Subsequently, as the depressed multiplier key is released, the parts start their return from an active position to the normal position shown in Fig. 10. Pawl 216, however, is held depressed by the associated tooth 220 and cannot return upwardly with the other parts until the inclined face of tooth 229 has permitted shifting of the pin carriage for an amount necessary to move the associated tooth 220 from over the nose of the pawl 216, so that the pawl 216 will work upwardly into engagement with the next tooth 220 to the left of the tooth with which it was engaged before depression of the multiplier key. Shortly before the depressed key is restored to its upper position, the one-step shift is completed, whereby all of the pin setting and escapement shift parts will also be restored to normal position and the carriage will be conditioned for a subsequent shifting movement. The timing of the escapement operation provides for shifting of the pin carriage substantially at the end of the return of the depressed key, to insure restoration of all the pin setting parts to a position out of the path of the pin carriage before the major part of the shifting movement thereof is effected.

From the foregoing description it will be seen that each time a multiplier key is depressed the aligned rack segment and selected pin of the pin carriage are set while at the same time the carriage has escaped one step toward the left of the machine to display the set figure through the multiplier sight opening 209. This operation is repeated as the various digits of the multiplier are set into the machine. If a mistake is made in setting a multiplier digit, such mistake can be corrected by resetting the multiplier racks as will be described hereinafter.

In the right-hand, or normally inactive position of the pin carriage 201, each of the multiplier rack segments 203 are latched in their "0" indicating position. Therefore, the pin carriage 201 has but to be ordinally shifted from its inactive to its active position with each depression of the "0" key 200A, whereupon each corresponding actively positioned sector 208 will indicate a "0" in the sight opening 209 of the machine cover as seen in Fig. 1. Thus, each depression of the "0" key 200A serves only to rock arm 227 (Fig. 10) to control the escapement mechanism described supra. In the normal position of the parts as shown in Fig. 10, it can be seen, therefore, that rocking movement of the pawl 216, independent of the pawl arm 224, will serve to disengage the nose of pawl 216 from the associated tooth 220 of the carriage escapement rack 221, thereby releasing pin carriage 201 for unrestrained movement to the right as viewed in Fig. 10. Such an independent rocking movement of the pawl arm 216 by mechanism to be hereinafter described will serve to actively position a predetermined number of the rack segments 203 and their associated indicating sectors 208 in a "0" registering position in sight opening 209.

*Multiplier rack restoring means*

The differentially adjusted positions of racks 203 are utilized to control the number of registrations of the multiplicand in the accumulator, and to shift the accumulator from left to right after multiplication by each multiplier digit to enable correct registration of the next ordinal product as well as to shift the pin carriage, so that the next higher order rack 203 comes into controlling position with respect to the operation of the machine. To enable exercise of the above control, means is provided for returning each adjusted rack, step by step, to its initial position, this operation being successive from the adjusted rack of lowest order with the shifting of the accumulator and the multiplier pin carriage following the last step of movement of each rack to condition the machine for operation in the next higher order.

The operating mechanism for the racks comprises feed pawl 235 (Fig. 8) which is pivotally secured at 236 to the end of an arm 237 pivoted at 238 on the frame 12. Pawl 235 is urged in a counter-clockwise direction as viewed in Fig. 8 by spring 239 which is attached at one end to lug 240 of pawl 235. Lug 240 is spaced from arm 237 in the inactive position of pawl 235 and engages arm 237 to limit the rocking movement of the pawl upon movement to active position. Pawl 235 is held in inactive position by its upward extension 241 engaging behind holding pawl 242 which is secured at the end of shaft 243 which is suitably pivoted in the framework. Both pawls 235 and 242 are maintained inactive until the multiplying operation is started. The inactive position being shown in Fig. 8.

In order to actuate pawl 235, arm 237 is pivotally connected to pitman 244 which engages an eccentric cam (not shown) secured on drive shaft 32 between disks 245. Pitman 244, arm 237, and pawl 235 are reciprocated once for each cycle or rotation of drive shaft 32 and the operation of the pawl 235 in its active direction occurs at the beginning of each cycle. However, the pawl 235 is held in inactive position until holding pawl 242 is allowed to move in a counter-clockwise direction from the position shown in Fig. 8 by oscillation of shaft 243.

*Multiplication keys*

The condition of the machine for the multiplying operation as controlled by the multiplication operation keys will now be described. Referring to Fig. 1, when one of keys 250, 251 or 252 is depressed and latched in depressed position, several functions of the machine are set into operation selectively in accordance with the type of operation determined by the key depressed. These functions include enabling of the control which determines the sign character of the registration of the product, enabling of the power set means for operating the sign character control, enabling of the carriage shift mechanism to determine return of the carriage to an end position, selective enabling of the resetting mechanism for the accumulator and the revolutions counter, setting the control for enabling feed pawl 235 for the multiplier racks, engaging the clutch and enabling the motor circuit. The mechanisms performing these functions and their relation to multiplication keys 250, 251 and 252 will now be described.

Keys 250, 251, and 252 (Figs. 8, 9, 11 and 12) are mounted for endwise sliding movement in respective keyboard plates 218 and are urged to raised position by respective springs 254 disposed on the slotted key pins and compressed between the key and lower plate 218. The raised position of the respective keys is determined by the respective latch arms 255 engaging the underface of upper plate 218. At their outer end latch arms 255 are provided with respective latching teeth for engagement with a single latching tooth 256, 257 (Figs. 8 and 9) on respective latch levers 258, 259 secured on transverse shaft 260 which is suitably journalled in auxiliary frame plate 261 and vertical frame plate 262 of the machine. Latch levers 258 and 259 are urged in a counter-clockwise direction as viewed in Fig. 9 by spring 263 suitably tensioned between the frame and the lower end of lever 258. The lower end of lever 258 is also operatively related with an arm of bellcrank 210, whereby the latch for the depressed key 250, 251, or 252 can be released at the end of the multiplying operation as later described. Suitable interlocking means may be provided for preventing simultaneous depression of the keys.

*Registration sign character control*

Means are provided under control of the multiplication keys for selecting the sign character of the registration of the product in the accumulator to be positive if keys 250 or 252 are depressed and to be negative if key 251 is depressed, such means being enabled by depression of a selected key and subsequently operated by power means also enabled by depression of the key. Similar pins 270 (Figs. 9 and 12) of keys 250 and 251 extend through the adjacent frame plate and engage in respective slots of the forward ends of levers 271, 272, respectively, which are offset laterally intermediate their ends to extend beyond the adjacent plate 262 and have their hubs pivoted on shaft 273.

Lever 271 (Figs. 9 and 12) has a pin 274 at its rearward end engaging a vertical slot in arm 275 pivotally mounted at 276 to the frame. Arm 275 is connected by spring 277 with positive setting arm 278 which is pivoted at 279 to power setting means therefor, in the form of bellcrank 280 pivoted at 281 on frame plate 12. Arm 278 is urged upwardly by spring 277 against a roller 282 on arm 275 so that in effect arms 275 and 278 move with lever 271 upon depression of key 250. At its rearward upwardly offset end, arm 278 has notch 283 for engagement with the pin 284 at the upper end of lever 285 secured on the end of transverse shaft 58 whose rocking movement, as previously described, moves gate 59 to control the engagement of the plus-minus gears with the numeral wheel gears and therefore control the sign character of the registration.

Normally, notched end 283 of arm 278 is maintained below pin 284, but can move to active position and into engagement with pin 284 under the influence of spring 277 when key 250 is depressed to move lever 271 to active position. It will be noted that spring 277 provides a yieldable connection whereby arm 278 can be held against movement to active position or moved from active position. Arm 278 engages pin 290 on lever 291 pivoted at 292 on the frame and having ear 293 overlying stop 294 on pin carriage 201 in the right-hand position of carriage 201 or the active rack 203 in any shifted position. Therefore, unless a value is set into the pin carriage, no setting of arm 278 can be made. Similarly, the rearward end of lever 272 (Figs. 8 and 9) which is associated with minus multiplication key 251, is connected by spring 295 to arm 296 which is urged against pin 297 on lever 272. Arm 296 is pivotally connected at 279 to actuating bellcrank 280 and has its downwardly offset notched end 298 for engagement with pin 299 at the lower end of lever 285. Arm 296 also has an upward extension engaging pin 290 on lever 291.

Thus it will be noted that depression of key 250 rocks arm 271 to raise the rearward end thereof to allow notched end 283 of arm 278 to move into engagement with pin 284, whereby upon subsequent counter-clockwise movement of bellcrank 280, lever 285 and shaft 58 will be moved to mesh the plus gears with the numeral wheel gears. Similarly, if key 251 is depressed, lever 272 serves to control the engagement of notched end 298 of arm 296 with pin 299, thereby conditioning the plus-minus control mechanism to determine negative registration of the product in the accumulator. As explained above, however, the arm 278, or arm 296 can only move to active position if lever 291 is free for movement because of entry of a value into the multiplier pin carriage 201.

Referring now to Figs. 8 and 9, key 252 overlies a roller 300 of arm 301 pivotally mounted at 302 and integrally connected with arm 303. Arm 303 is pivotally connected at its lower end with link 304 which extends rearwardly and is pivotally connected at its rearward end with bellcrank 305 pivoted at 306 on the frame. The horizontal arm of bellcrank 305 is pivotally connected to link 307 which is also pivotally connected to arm 275 so that counter-clockwise movement (Fig. 9) of arm 303 pulls link 304 forwardly and rocks bellcrank 305 in a counter-clockwise direction to lift arm 275 to tension spring 277, so that arm 278 is urged upwardly to engage notched end 283 with pin 284. The slotted connection of pin 274 with arm 275 provides for selective tensioning of spring 277 from key 250 or key 252.

Thus, each of keys 250, 251 and 252 controls the setting of linkage which in turn will cause setting of the plusminus gears upon oscillation of power setting bellcrank 280. To effect power setting of the plus-minus gears by oscillation of bellcrank 280, roller 312 is provided on bellcrank 280 (Fig. 9) for cooperation with power setting cam 313 which is slidably and nonrotatably mounted on shaft 32 by a suitable slidable driving connection. Cam 313 is normally urged to inactive position by a spring compressed between the cam and a disk secured on shaft 32 for a purpose not pertinent to the instant invention.

Cam 313 (Fig. 12) is engaged by a suitable roller at the upper end of lever 314 pivoted at 315 on an ear formed at right angles to frame plate 262 and having its lower cam end engaged by roller 316 carried at the end of lever 317 pivoted at 318 on frame plate 262. Lever 317 is spring urged in a clockwise direction as viewed in Fig. 12 through its pivotal connection at 319 with bellcrank 320 which is pivoted at 321 on the frame. Bellcrank 320 is urged in a counter-clockwise direction by spring 322, therefore also placing lever 317 under a clockwise urgency.

Means are provided for preventing such clockwise movement of the lever 317 to enable the power setting operation, such mechanism being first conditioned by operation of one of the multiplier keys and then subsequently enabled at the end of the shifting or shifting and resetting operation. The forward end of lever 317 is provided with an offset ear engaged by the upper arm of bellcrank 323 pivoted at 324 on the frame and urged in a counter-clockwise direction by spring 325. Thus, bellcrank 323 latches lever 317 against operative movement. For releasing latch bellcrank 323, U-shaped lever 326 secured on shaft 302 is provided with pin 328 overlying the horizontal arm of bellcrank 323 and roller 329 lying under extended portions of levers 271, 272 which are operated by the key depression, and also under an extension of lever 317. Therefore, upon depression of key 250, or 251, the vertical arm of bellcrank 323 is moved from beneath the end of lever 317. However, this merely conditions the lever 317 for operation as it is still maintained inoperative by the engagement of latch lever 330 with roller 331. Lever 330 is secured on the shaft 332 journalled in the frame plate 262 and is urged in a clockwise direction by spring 442. To control the conditioning of power setting enabling lever 317 from the key 252, U-shaped lever 326 is rocked through shaft 302 and arm 334 pinned thereon (Fig. 8).

As explained hereinafter, shaft 332 (Fig. 12) carrying pawl 330 is oscillated at the end of the carriage shifting or carriage shifting and resetting operation to disable latch pawl 330 with respect to pin 331 to enable the power setting operation.

To prevent relatching of a multiplication key in depressed position if held there after the multiplying operation, latch lever 330 has pivotally mounted thereon at 341 a bellcrank 340 carrying a pin 342 overlying the lower arm of U-shaped lever 326. Bellcrank 340 is urged in a clockwise direction by spring 333 and has its upright end adjacent and normally above square pin 343 on arm 344 secured on shaft 260, which also carries key latch arms 258, 259 (Figs. 8 and 9). As previously explained, the shaft 260 is operated upon depression of a multiplication key so that it will rock arm 344 upwardly and immediately downwardly when the key latch engages so that pin 343 provides a stop for bellcrank 340. Subsequently, when the key release mechanism is operated, if the key is maintained depressed, i. e., lever 326 does not operate to restore bellcrank 340, the upright arm of bellcrank 340 will move under pin 343 to maintain the key latch inactive.

At the end of the carriage shifting or carriage shifting and resetting operation the power setting bellcrank 280 is moved to active position and means are provided for latching said bellcrank and the plus-minus gears controlled thereby in active position. Such means may comprise latch arm 348 (Fig. 9) pivoted at 349 on plate 12 and urged in a counter-clockwise direction by a spring (not shown). Latch arm 348 has notched lower end 350 for engagement with square pin 351 on bellcrank 280. Thus, the bellcrank 280 can be latched in active position where its lower end is moved away from stop 352. The latch arm 348 can be moved to inactive position by arm 353 in a manner later described.

*Carriage return and resetting control*

Upon depression of either of multiplication operation keys 250 or 251 means are brought into play to first determine shifting of the carriage to its left end position as a preliminary to the multiplying operation. Where a resetting operation is desired, key 252 is operated and a return and resetting operation may be performed to selectively zeroize the accumulator, the counter, or both in accordance with the adjustment of the resetting mechanism.

Key 252 (Figs. 2, 7 and 8) carries pin 356 which engages the slotted end of lever 357 pivoted at 358 on frame plate 261. Lever 357 carries pin 359 engaging arm 150 secured on shaft 121. Arm 150, as previously described, operates through pusher link 151 to move push rod 155 of the resetting mechanism to operative position so that upon depression of the key 252, push rod 155 engages a resetting drive connection. At the same time, the oscillation of shaft 121 serves to oscillate arm 136 carrying pusher link 137 which operates through pin 141 and depending arm 142, sleeve 143, arm 144, and pin 145 to move left shift push rod 112 into position to engage the left-hand shift mechanism.

The oscillation of shaft 121 also operates through arm 122 and pin 123 to oscillate arm 124 pivoted on shaft 125 when finger 126 of arm 124 (Figs. 4 and 7) engages pin 127 at the lower end of lever 128 for rocking movement thereof to close the motor circuit and engage the clutch.

The shifting mechanism will operate until the carriage reaches its end position, and with the resetting mechanism being enabled during the first cycle of operation with the carriage in its left end position, a resetting operation will occur. During the resetting operation, override pawl 88 (Fig. 5) will be operated to engage slide 188 to move it downwardly. Slide 188 (Fig. 4) operates bellcrank 189, link 190, and arm 191 (Figs. 2, 4 and 7) depending from cross shaft 192. Shaft 192 operates through arm 193 to raise pusher link 137 out of operative engagement with pin 141 and thereby disables the shift mechanism. Shaft 192 also operates through arm 194 to lift pusher link 151 to disengage the resetting control from the resetting push rod 155. At the same time that arm 194 lifts the pusher link 151 it operates lever 362 pivoted on shaft 121, which lever is pivotally connected to link 363 having a pivotal connection at its other end to arm 364 on shaft 332. As seen in Fig. 12, shaft 332 also carries latch pawl 330 so that this movement rocks the latch pawl 330 to release the power setting control 317 and enable power setting of the plus-minus gears and beginning of a multiplying operation.

Keys 250, 251 operate generally in the same manner to initiate the multiplying operation with a return of the carriage to its left end position. The respective levers 271, 272 operated by keys 250 and 251 overlie pin 365 (Fig. 12) carried by lever 366 which is mounted similarly to levers 271, 272 on shaft 273. Lever 366 has pin 367 engaging a forked end of link 368 pivotally connected at its lower end to arm 369 on shaft 370. Shaft 370 (Fig. 7) carries arm 371 having spring-urged pusher link 372 pivoted thereon with its notched end engaging pin 373 carried by arm 374 depending from shaft 146 which carries arm 114 controlling the left-hand shift mechanism.

Thus, upon depression of either of keys 250 or 251 the operation starts with carriage shifting, but the resetting mechanism is inactive so that the amount entered is accumulative to the amounts in the accumulator and the counter. The depression of either of keys 250 or 251 through the movement of the lever 366 and link 368, also serves to operate bellcrank 375 (Fig. 12) which is secured on shaft 125. At its other end shaft 125 carries upstanding arm 376 (Figs. 4 and 7) pivotally engaged with clutch-engaging slide 377 mounted for endwise movement on similar studs 378 in the frame, and pivotally connected at 132 to clutch engaging pawl 39 so that it engages the clutch and also closes the motor circuit.

From the above it is seen that either of multiplication keys 250 or 251 will start operation of the machine to return the carriage to its left end position. During the overstroke cycle with the carriage in its left end position no resetting operation occurs, but override pawl 88 operates through slide 188, bellcrank 189, link 190, arm 191, and shaft 192 to rock arm 194 and therefore arm 362 when pin 379 thereon, underlying pusher link 372 lifts link 372 out of engagement with pin 373 and thereby disables the shift connection to the left shift mechanism. At the same time, rocking of arm 362 operates through link 363, and arm 364 to rock shaft 332, thereby moving latch pawl 330 (Fig. 12) to release the power setting control 317 in the same manner as described in connection with key 252.

*Multiplier feed enabling mechanism*

At about the time the power setting operation of the plus-minus gears is effected the feed pawl for the racks of the pin carriage is also enabled. To enable the feed pawl 235 by release of the holding pawl 242, shaft 243 (Figs. 8 and 12) upon which holding pawl 242 is mounted, carries arm 380 having pin 381 engaging the slotted end of arm 382 pivotally connected at its other end on pin 319 of the lever 317 for movement therewith. Pin 381 is also engaged by a spring 383 which constantly urges arm 380 and shaft 243 to move the holding pawl 242 in a counter-clockwise direction as viewed in Fig. 8. Therefore upon release and operation of power setting lever 317, arm 380 and the holding pawl 242 are also released to allow the feed pawl 235 to move into engagement with the aligned rack 203 for control thereof.

*Accumulator and pin carriage shift control*

As pointed out, irrespective of which key 250, 251, or 252 is depressed, after the initial carriage return or carriage return and resetting operation, the multiplying operation proceeds in the same manner once it is enabled by the overstroke of the shift mechanism upon return of the carriage to the left end position. It will be recalled that upon such overstroke, the power setting means for the plus-minus gears is brought into play and also the step-by-step return of the aligned multiplier rack 203 is enabled by movement of pawl 235 to active position. During the multiplying operation, power setting bellcrank 280 is latched in active position by the engagement of pin 351 with latch arm 348 to maintain the plus-minus gears in operative engagement.

During its last step of movement the active rack 203 engages lever 291 (Figs. 8, 9 and 12) whereupon pin 290, overlying the upper end of arms 278 and 296, moves the operatively positioned arm 278 or 296 out of engagement with the respective pin 284 or 299 to allow the lever 285, shaft 58, and the plus-minus gears to restore to their neutral position for a shifting operation under control of their usual centralizing means. This release is effected before completion of the registering operation, but lever 285, shaft 58, and the plus-minus gears are held in engagement until the end of the last registering cycle by a conventional form of cycle lock (not shown). The oscillating movement of lever 291 also serves through link 390 to lower hooked arm 391. Arm 391 is constantly oscillated during multiplication by the engagement of the pin 392, carried by cam disk 313, with arm 393 to which arm 391 is pivotally connected. By such lowering, the hook end of lever 391 can engage the pin 394 on latch pawl 395 which is pivoted at 396 and is normally urged into latching engagement with lever 353 secured on shaft 397 by a conventional spring means not shown. Arm 353 is connected by link 398 with centralizing lever 399 pivoted on shaft 306 and having slotted end 400 for engagement with pin 299 of the lever 285, so that during the shifting cycle the lever 285, shaft 58, and plus-minus gears are positively held in centered position where they are moved by the well known form of centralizing mechanism.

The rocking movement of arm 353 and shaft 397 also serves through arm 404 and link 405 (Fig. 9) to rock arm 406 on shaft 243 which carries holding pawl 242 and therefore moves the actuating pawl 235 to inactive position during a shifting cycle. Shaft 397 also serves to engage the right shift mechanism and for this purpose has arm 407 (Fig. 7) slidably and nonrotatably engaged thereon. Arm 407 is normally out of alignment with pin 408 controlling right shift push rod 112, being held against the urgency of spring 409 by slide 410, which is slidably mounted on shaft 397 and abuts shift rack 411 of pin carriage 201. The first step of shifting movement of carriage 201 during setting-up of the multiplier is insufficient to align arm 407 with pin 408 and such alignment occurs after the second shift, i. e., when the second multiplier digit is entered which is the extent of sliding movement permitted slide 410 and arm 407. Shaft 397 also carries arm 412 (Fig. 8) having pin 413 engaged in the grooved collar 414 carrying slidable actuator 415 for control of shift rack 411 of the pin carriage 201, so that this shift is also enabled by the same rocking movement of shaft 397 against the urgency of spring 416 (Fig. 7) connected to arm 407. Actuator 415 is driven from shaft 417 as described in said Patent No. 2,371,752.

The accumulator and pin carriage shift mechanisms, during the multiplying operation, are disabled after one cycle of movement if a value other than "0" is set in the next active multiplier rack 203. In the normally latched position of arm 353 (Fig. 9), arm 404 lies out of the path of pin 392 on disk 313 as seen in Fig. 9. However, upon delatching of arm 353 and rocking of arm 353 and shaft 397, arm 404 is positioned for operation by pin 392 and during the shift cycle is engaged by pin 392 to restore arm 353 for latching engagement by latch pawl 395 under the influence of its spring (not shown).

Power setting bellcrank 280 is also delatched during the shift cycle by the engagement of lever 353 with pin 418 on latch lever 348, so that the plus-minus gears, which are in inactive position during shifting, can be reset by bellcrank 280 and cam disk 313 at the beginning of the next cycle if the next active multiplier rack 203 is set to a multiplier digit value. If rack 203 is not set, i. e., is at "0," another shifting cycle follows immediately by the positioning of lever 291 as previously described.

Multiplier correction key 253 for erasing amounts set into the multiplier pin carriage without entry of values into the accumulator or counter may be similar to and operates in the same manner as shown in said Patent No. 2,371,752,

*Multiplication key release*

The release of a depressed multiplication key is controlled in the manner disclosed in said Patents Nos. 2,371,752 and 2,399,917. Briefly, as the pin carriage 201 is shifted to its normal inactive position where the leftmost indicating dial is to the right of the sight opening therefor in the casing, the resulting rocking movement of the spring-urged bellcrank 210 (Fig. 9) operates through one arm thereof to engage the lower end of lever 258 of the key latch assembly, so that the rocking movement of bellcrank 210 acts to move latch teeth 256 and 257 out of engagement with the depressed key which is therefore free to rise. Bellcrank 210 is held in delatching position by the pin carriage until a multiplier factor is entered into the carriage. It will be understood that upon depression of any multiplier key 200 the pin carriage is shifted under the control of its escapement mechanism so that bellcrank 210 is disabled with respect to the multiplication key latch mechanism. This is true, whether or not the keys 200 from "1" to "9" are used in entering a multiplier digit or whether the "0" key 200A is used in order to control a carriage tabulation to a selected ordinal position.

*Multiple zero mechanism*

Means are provided for automatically effecting the entry of a plurality of successive zeros into the multiplier pin carriage 201. It will be recalled that upon depression of the "0" key 200A (Fig. 11) the pin carriage escapement mechanism becomes operative to effect an ordinal shift of the pin carriage 201 into active position with respect to feed pawl 235 (Fig. 8), the number of zeros so entered being indicated by the indicating sectors 208 with the "0" registration thereon appearing in the sight opening in the casing. In the normally inactive position, i. e., the right-hand position of the pin carriage 201, as viewed in Fig. 13, it will be recalled that all the segmental racks 203 (Fig. 8) and therefore the associated indicating sectors 208 are normally latched in their "0" position. Upon depression of a multiplier key 200, the leftmost rack and sector in the pin carriage 201 is released and each rack and sector to the right thereof is successively released with each multiplier key depression. Substantially simultaneously with the shifting of each rack 203 and its sector 208, depression of the value key serves to control the escapement mechanism thereby effecting an ordinal shift of the pin carriage to the left, as viewed in Fig. 13, to align the now active rack with feed pawl 235 (Fig. 8), whereupon the sector 208 indicates the value of the key depressed in the sight opening 209 of the casing 11. It will be recalled, however, than when a "0" occurs in the factor to be entered into the multiplier mechanism, depression of the "0" key 200A operates to control the escapement alone and thereby effect an ordinal left shift of the pin carriage 201 with the corresponding rack and sector in its latched position. It is therefore readily apparent that a disablement of the stop pawl 216 (Fig. 10) associated with the escapement mechanism will cause the pin carriage 201 to be shifted to an extreme left position or to a predetermined ordinal position as described hereinafter. Means for automatically entering successive plural zeros into the pin carriage will now be described.

An auxiliary key 425 (Figs. 1, 9, 10, 11, 12 and 13) is mounted on the forked end of a rockable lever 426 in the center of and immediately above the multiplier keys 200. At its forward end lever 426 is secured to a transverse shaft 427 (Figs. 9 and 12) journalled in auxiliary frame plate 261 and vertical frame plate 262 for rocking movement upon manipulation of key 425. Shaft 427 has one end of an arm 428 secured thereon and at its other end, arm 428 carries a pin 429 engaging in a slot 430 near the forward end of a lever 431, such slot being of sufficient length to permit reciprocatory movement of lever 431 which is pivotally connected at 434 to the lower end of one arm of a bellcrank 435. Pivoted at 436 on frame plate 262 bellcrank 435 carries a second arm 437 underlying an extension 438 (Figs. 10 and 12) of escapement stop pawl 216 whereby a rearward movement of the lever 431 serves to rock bellcrank 435 clockwise to impart a counter-clockwise rotation to pawl 216 (Fig. 10). Such movement of the pawl 216 against the urgency of spring 219 moves the nose of the pawl from its active engagement with the associated tooth 220 of the multiplier pin carriage rack 221 (Figs. 8 and 13).

Means are provided under the control of the multiplication keys 250, 251 and 252 to disable the stop pawl 216 thereby effecting the registration of a plurality of zeros in the sight opening in the case of the machine. Lever 431 has a nose 439 at the rearward end thereof for operative engagement with a pin 440 on the upper end of an arm 441 secured on shaft 125. A spring 442 is secured at its one end to a pin on latch pawl 330 and at its other end to a pin on lever 431 to normally maintain lever 431 in the inoperative position shown in Fig. 12 against a pin 443 on arm 441. At its rearward end the lever 431 has one end of a link 444 pivotally connected thereto which, at its other end, is pivoted at 445 to a restore lever 446 rotatably mounted at 447 on frame plate 262. Upon counter-clockwise rocking of lever 446, a roller 448 on the free end thereof is moved into cooperative relation with a cam 449 secured on drive shaft 32.

When a multiple zero entry into the pin carriage 201 is desired, i. e., when it is desirable to shift the pin carriage into its active position a number of ordinal spaces equivalent to the number of zeros to be entered, key 425 (Figs. 8, 9, 10 and 12) is depressed and arm 428 (Fig. 12) is rocked counter-clockwise whereupon pin 429 imparts a clockwise rotation to lever 431 to position the nose 439 thereof into operative engagement with pin 440. With the engagement of the nose 439 with the pin 440 the lever 446 is rotated counter-clockwise to position the roller 448 for control by the cam 449 at the end of the first machine cycle to restore the parts to their normally inoperative positions. A detent arm 455 is pivoted at 456 on the framework of the machine and is urged by a spring 457 into abutting relation with an extended end of shaft 324. Arm 455 has a V-nose at its upwardly extending free end for camming engagement with pin 429 so that, upon rocking of the arm 428 by key 425, pin 429 is moved to a position below the nose of arm 455, whereupon spring 457 serves to latch levers 431 and 446 in their operative positions.

A depression of a multiplaction control key 250, or 251 subsequent to the depression of the key 425 serves through levers 271 or 272 to rock lever 366 clockwise (Fig. 12), which operates through link 368 to rock arm 369 and shaft 370 counter-clockwise to enable the accumulator carriage left shift mechanism. Link 368 also serves to rock bellcrank 375 and shaft 125 to engage the clutch and close the motor contacts, as previously described, to initiate a multiplication operation. The counter-clockwise rotation of shaft 125 and arm 441 secured thereon, serves through pin 440 to move lever 431 rearwardly, thereby rocking bellcrank 435 clockwise to release the nose of the stop pawl 216 (Fig. 10) from its active engagement with an associated tooth 220 of the multiplier pin carriage rack 221. Depression of multiplication control key 252 operates in a similar manner to that of key 250 and 251 except that rocking of bellcrank 357 (Fig. 2) imparts a clockwise rotation to shaft 121 to engage the left shift mechanism for the accumulator and the zero resetting mechanism for the accumulator and/or revolutions counter. With the clockwise rotation of shaft 121 (Fig. 4) the arm 124 is rocked clockwise to impart a counter-clockwise rotation to lever 128 thereby engaging the clutch, closing the motor contacts, and through pin 132 and slide 377 rocks arm 376 and shaft 125 clockwise, or counter-clockwise as viewed in Fig. 12, to disable the escapement stop pawl 216 as described supra.

Multiple zero tabulation of the multiplier pin carriage is completed during the first machine cycle. This cycle will be the first cycle of a shifting operation if the carriage is not in the proper ordinal position or it will be the idle cycle required to rock the overstroke pawl 88 (Fig. 5) if the carriage is in its leftmost position when the multiplier key is depressed. Near the end of this cycle, or the first machine cycle, cam 449 (Fig. 12) operates to rock lever 446 clockwise thereby moving the nose 439 of the lever 431 from its engagement with the pin 440, whereupon a spring 458 is effective to move the lever 431 forwardly of the machine, guided in its movement by pin 429 which has been moved to its normally inoperative position with respect to the nose of detent pawl 455. With the restoration of the parts to the position shown in Fig. 12, key 425 is likewise restored to is raised position and the escapement stop pawl 216 is rendered effective to check the multiplier pin carriage in each ordinally restored position thereof by the multiplication mechanism, as described heretofore and more fully disclosed in the afore-mentioned Patents Nos. 2,371,752 and 2,399,917.

Means are provided for selectively determining the number of multiple zeros to be entered into the multiplier carriage upon depression of key 250, 251, or 252 following the depression of key 425. Upon depression of the auxiliary key 425, means are rendered operative to determine the extent of ordinal shifting movement of the pin carriage 201 when the escapement stop pawl 216 is disabled. For this purpose a square shaft 462 (Figs. 8, 9, 13 and 14) having a cylinder 463 slidably and non-rotatably mounted thereon is journalled in frame plate members 261, 262 and is axially parallel to pin carriage guide shafts 230 and 231. Cylinder 463 comprehends a stepped cam having ten equiangularly spaced teeth, or notches, 464 formed in the peripheral surface thereof corresponding to the number of racks 203 in the pin carriage 201. Each of the teeth 464 are also differentially staggered circumferentially and axially of the cylinder in accordance with the linear spacing of the rack sectors 203 of the pin carriage 201. Referring now to Fig. 16, the stepped cam 463 may be seen in its developed form.

A second shaft 465 (Figs. 13 and 14) is secured at its ends to frame plate members 261 and 262 in a plane parallel to shaft 462 and carries a stop pin 466 for engagement by a selected one of the teeth 464 to determine the extent of sliding movement of cam, or cylinder, 463. To select the tooth 464 for engagement with the pin 466 the shaft 462 is rotated clockwise or counter-clockwise to position the selected tooth in operative alignment with the pin. For this purpose shaft 462 has a knurled handle 467 secured to one end thereof and integrally connected to a dial 468 bearing numerals from "1" to "10." A gear 469 is pinned to the dial 468 concentric therewith and having teeth angularly disposed thereon corresponding to the numerals on the dial 468. A detent arm 470 (Figs. 13 and 15) is pivotally mounted at 471 on vertical frame 262 and carries a pin 472 which is urged by a spring 473 into engagement between the teeth of gear 469 in each adjusted position of the dial 468. Thus, it can be seen that upon setting of the dial 468 to a selected numeral the stepped cam 463 is similarly rotated to align the corresponding tooth 464 thereof for determining the subsequent shifting movement of the cam 463 and pin carriage 201, as will now be described.

Sliding movement of the stepped cam 463 is controlled by a bail 474 (Figs. 13 and 14) slidably and rotatably mounted on shaft 462 and having arms 475 and 476 embracing the ends of the cylindrical cam 463. A spring 477 has its one end secured to the frame of the machine and its other end engaging a pin on arm 475 and serves to yieldably maintain the bail 474 and therefore cam 463 in a right-hand, or inoperative, position, as seen in Figs. 13 and 14. The yoke 478 of bail 474 has ten notches 479 formed in the lower edge thereof by the teeth 480 for selective engagement with a tooth 481 secured to the right end of the pin carriage escapement rack 221. Upon the counter-clockwise rocking movement of the bail 474, as viewed in Fig. 8, one of the notches 479 (Fig. 14) may be rocked into engagement with tooth 481 on the escapement rack 221 in any shifted position of the pin carriage 201. Thus, it can be seen that the bail 474 and cam 463 are moved laterally to the left, as viewed in Fig. 13, with the subsequent shifting of the pin carriage 201. Such an integrated movement of the pin carriage 201 and cam 463 is effective, upon depression of the multiplication control key 250, 251, or 252, to ordinally shift the pin carriage 201 to a position determined by the engagement of a selected tooth 464 with the pin 466 (Figs. 13 and 14).

To control the rocking movement of the bail 474 (Fig. 8, 9, 12, 13 and 14) yoke 478 carries an inverted L-shaped member 486, the horizontal portion of which extends the length of the yoke and is slidable in a channel 487 provided at the rearward end 488 of the lever 426 on which key 425 is mounted. In operation therefore, during the entry of a multiplier factor into the pin carriage 201, each depression of a multiplier key 200 serves to differentially adjust the corresponding rack segment 203 (Fig. 8) and to effect an ordinal shift of the pin carriage to the left, as viewed in Fig. 13. When such a multiplier factor contains one or more zeros appearing successively therein, the dial 468 is rotated to a position representative of the number and upon the occurrence thereof, when setting the factor into the carriage 201, the key 425 is depressed (Figs. 8 and 13) to rock the associated notch 479 of the bail 474 into engagement with the relatively positioned pin 481 on the pin carriage rack 221 for subsequent sliding movement therewith. As described hereinbefore, the depression of the key 425 also serves through arm 428 (Fig. 12) to rock lever 431 into operative engagement with the pin 440 on arm 441 and to rock lever 446 and its pin 448 into position for control by the cam 449. A depression of control key 250, 251, or 252 then operates to rock shaft 125, thereby moving lever 431 rearwardly and rocking bell-crank 435 clockwise to lift the extended end 438 of the stop pawl 216 (Fig. 10) to release the nose thereof from its engagement with an associated tooth 220 of the pin carriage rack 221. The pin carriage 201 is immediately shifted to a differential position determined by the engagement of the selected notch 464 with the pin 466 (Fig. 14). In the first machine cycle, that is, the first left shift cycle, or the idle overstroke cycle if the carriage is in its leftmost position, the cam 449 (Fig. 12) serves to rock lever 446 clockwise, thereby releasing the nose 439 from its engagement with the pin 440. Thereupon the spring 458 becomes operative to move the lever 431 forwardly of the machine and to rock bellcrank 435 counter-clockwise so that the nose of the stop pawl 216 may again engage between the associated teeth 220 of the escapement rack 221. With the clockwise rocking of the lever 446, arm 428 and key 425 are likewise restored to their normal condition, whereupon the rearward extension of the lever 426 cooperates with the L-shaped member 486 (Fig. 8) to rock the bail 474 clockwise. When this happens the spring 447 (Fig. 13) immediately restores bail 474 and stepped cam 463 to their normally inoperative position for the active notch 479 has been disengaged from the pin 481 of the pin carriage rack 221. The ensuing multiplication operation is then performed in a conventional manner, as previously described.

Means are provided to immediately restore the key 425 to its normally inoperative position upon depression of the multiplier correction key 253 (Figs. 11 and 17). For this purpose, a relatively strong spring 489 is coiled about a pivot 490 on a bracket 491 secured to top keyboard plate 218 having one end underlying the multiplier correction key 253 and its other end underlying the lever 426 upon which key 425 is mounted. Therefore, whenever an erroneous multiplier factor has been entered into the pin carriage 201 and the key 425 has been inadvertently depressed, a subsequent depression of the multiplier correction key 253 serves, through spring 498, to immediately restore key 425 to its inoperative, or raised position and to also control a multiplier correction operation as fully disclosed in the afore-mentioned Patent No. 2,371,752.

There is a modification of the multiple zero entry control mechanism disclosed herein which will now be described. Referring now to Figs. 18, 19 and 20, a shaft 1462 journalled in frame plate members 261, 262 carries a dial 468 at its left end having the numerals "1" to "10" thereon and a 10-tooth detent gear 469 integral therewith. Dial 468 is retained in any adjusted position thereof by the engagement of a pin on detent arm 470 which is resiliently urged into engagement with the teeth of the gear 469 in a well known manner. A stepped cam 1463 is likewise secured to shaft 1462 for rotation therewith and is positioned to the left of the normally inoperative position of the pin carriage 201, as viewed in Fig. 13. Cam 1463 has differentially stepped teeth 1464 (Fig. 18) formed in the peripheral surface thereof and identical to the teeth 464 of the cam 463, as seen in Fig. 16. A bail, shown generally at 1474, has its two arms 1475 and 1476 slidably and rotatably mounted on a shaft 1465 secured at its ends in frame plate members 261, 262 and positioned axially parallel with the axis of shaft 1462 in spaced-apart relation for the operative cooperation of a tooth 496 on arm 1476 with a selected tooth 1464 of the cam 1463. Spring 477 normally urges bail 1474 to the inactive position shown in Fig. 18 with respect to stepped cam 1463. Tooth 496 on arm 1476 is normally positioned out of operative alignment with a selected corresponding tooth 1464 of the stepped cam 1463, but may be moved into alignment therewith upon counter-clockwise rocking of the bail 1474, as viewed in Fig. 19.

A yoke 1478 of the bail 1474 (Fig. 20) has ten notches 1479 in the lower edge thereof formed by the teeth 1480 corresponding to the ten sectors 203, 208 of the pin carriage 201 and the ten teeth 1464 of the stepped cam 1463. A tooth 481 is mounted on pin carriage rack 221 for selective engagement by a notch 1479, upon counter-clockwise rocking of the bail 1474, so that subsequent shifting movement of the pin carriage 201 and rack 221 serves to slide the bail 1474 along shaft 1465 until tooth 496 engages the aligned tooth 1464 of the stepped cam. The bail 1474 is rocked in exactly the same manner as described supra wherein yoke 1478 carries an inverted L-shaped member 1486 slidably engaged in a channel provided at the rearward end 488 of the lever 426. Thus, it is readily apparent that upon rotation of dial 468 (Fig. 18) to a position representative of the number of multiple zeros desired, for example, "3" as seen in Fig. 18, the number "3" tooth 1464 is positioned for subsequent engagement by the tooth 496 (Fig. 19) of the bail 1474. With the cam 1463 so positioned, the desired multiplier factor is entered into the pin carriage 201 by the keys 200, and the pin carriage 201 and its associated tooth 481 are shifted ordinally with each value so entered. To enter the three zeros, upon the occurrence thereof in the multiplier factor, key 425 is depressed to rock the associated notch 1479 of the bail 1474 into engagement with the relatively positioned tooth 481 on the multiplier pin carriage rack 221. As described hereinbefore, a depression of a multiplication control key 250, 251, or 252 disables the escapement stop pawl 216 (Fig. 10) to cause an unrestrained shifting movement of the multiplier pin carriage 201 to an ordinal position determined by the setting of the stepped cam 1463. Upon depression of control key 250, 251, or 252 the cam 449 (Fig. 12) serves to restore the escapement stop pawl 216 to its effective position with respect to the pin carriage rack 221 and to restore the auxiliary key 425 to its inactive position, thereby releasing the bail 1474 from its engagement with tooth 481 when the spring 477 becomes effective to restore the bail to its inoperative or rightmost position (Fig. 18).

*Automatic decimal indication*

In the preferred embodiment of the invention, the mechanism herein disclosed serves as a means for automatically causing a registration of one or more products around a common decimal point, irrespective of the number of decimal places in each multiplier and/or multiplicand. Means are inherent in the use of the multiple zero mechanism, whereby each product of various decimal factors may invariably be registered in the same decimal position in the accumulator register upon depression of control key 252. Similarly, the same products may be accumulated in the accumulator register around a predetermined decimal point therein upon depression of control keys 250 or 251.

Referring now to Fig. 1 the accumulator carriage 22 is provided with a bar 500 secured at its ends to the cover thereon and lying in front of, and adjacent, the sight openings 501 for the dials 21. Slidably mounted on the bar 500 the conventional decimal point markers 502 are manually movable to any selected position between the dials 21 to represent the decimal position of each registered product. Each marker 502 is retained in any moved position thereof by a well known frictional means.

The keyboard of the machine is likewise provided with conventional decimal indicating means in the form of rods 503 (Figs. 1 and 2) positioned immediately beneath the casing 11 and between each row of keys 26. A portion of the surface of each such rod 503 is coated with a color in contrast to that of the casing 11 so that in the indicating position thereof the active rod is quickly discernible in the associated openings 504 of the casing. Each rod 503 is selectively rotated from its nonindicating to indicating position by means of a knurled segment 505 secured thereon and extending above the casing 11 through a rectangular slot therein.

In performing a series of multiplication operations in which some or all of the factors involved are decimalized, the multiplicand having the greatest number of decimal places is first determined and this number is indicated on the keyboard by rotating the corresponding rod 503 to its indicating position. The multiplier having the greatest number of decimal places is likewise determined and this number is indicated in an opening in the casing 11 (Figs. 1 and 13) by rotating dial 468 to the number desired. One of the markers 502 is slidably moved on bar 500 (Fig. 1) to an indicating position determined by the sum of the places in the keyboard and the number indicated on the dial 468. For example, if the largest decimalized multiplicand contains three decimal values, as seen in Fig. 1, and the largest multiplier decimal is indicated as "4", the marker 502 would be moved to a position between "7" and "8" on the bar 500. The resulting product of each two factors thereafter multiplied in the series is registered singly or for accumulation in the register dials 21 in accordance with the control key depressed and the decimal portion thereof is automatically and invariably registered to the right of the positioned marker 502, while the whole number is registered to the left thereof.

In recalling the multiplying mechanism herein disclosed, it will be remembered that a depression of key 252 (Fig. 1) initiates a left shift of the carriage and a zero resetting operation, while the depression of keys 250 or 251 effects a left shift only of the carriage to an end position. In this leftmost position of the carriage 22 the overstroke pawl 88 (Fig. 5) is effective to disable the left shift and zero resetting mechanism (when enabled) and to release latch pawl 330 (Fig. 12). Upon release of pawl 330, the operation of the multiplying mechanism is initiated in a well known manner and continues under the control of each multiplier sector, or rack, 203 (Fig. 8) in the active position thereof with respect to feed pawl 235, each rack 203 being restored step-by-step to control the registration of the multiplicand in the product register. Upon restoration of each rack to "0" a centralization of the plus-minus gate 59 is effected and an ordinal shift of the accumulator register to the right is initiated. Simultaneous with the right shift of the product register, the multiplier pin carriage is likewise shifted one order to the right, as viewed from the front of the machine, when the next higher order rack 203 becomes effective to control the registration of the multiplicand in this shifted position of the register. As is well known each actively positioned rack 203 representing a "0" value of the multiplier factor becomes immediately operative to effect an ordinal right shift of the register and the pin carriage 201. It becomes readily apparent, therefore, that upon disabling of the escapement mechanism, a plurality of zeros is entered into the multiplier pin carriage, i. e., successive rack segments 203 in the "0" latched position thereof are shifted to the left, as viewed in Fig. 1, when each such rack so shifted operates under the control of feed pawl 235 (Fig. 8) to immediately effect an ordinal tabulation of the register to the right and shifting of the next higher order rack to its active position.

In the application of the instant invention as a decimal positioning or tabulating mechanism, using the setup shown in Fig. 1, the multiplicand is set in the keyboard around the decimal indicator 503 between the third and fourth keyboard orders and the integer portion of the multiplier factor is entered into the pin carriage 201 by the keys 200. Upon the occurrence of the decimal point in the factor, the key 425 is depressed and the decimal values appearing to the right of the decimal point in the factor are then entered by keys 200 followed by a depression of a multiplication control key 250, 251, or 252. If the dial 468 (Fig. 1) is set to indicate "4" and there are only two decimal places in the multiplier factor, the depression of a selected control key 250, 251, or 252 effects the additional entry of two zeros into the pin carriage. Following the shifting of the product register to its leftmost position, as seen in Fig. 1, the pawl 88 initiates the multiplying operation when the rack segments 203 become operative for the control thereof. Each of the two zeros which were entered into the pin carriage 201, as determined by operation of key 425 and the subsequent depression of a control key 250, 251, or 252, serve to effect a tabulation of the register and shifting of the pin carriage two ordinal places to the right. The lowest or hundredths value rack of the multiplier is now, therefore, in its active position to effect registration of the multiplicand in the register with the correct number of decimal places automatically indicated by the marker 502 (Fig. 1). Upon step-by-step restoration to "0", the active rack 203 operates to initiate a third right shift of the accumulator register and the pin carriage to move the tenths value rack into active position. The multiplicand is again registered in the accumulator in accordance with the tenths value of the multiplier and in proper decimal relation to that portion of the product registered under control of the hundredths value. This sequence of operations continues until the entire product appears correctly positioned with respect to marker 502.

The following will serve as a suitable example for a better understanding of the operation of the multiple zero mechanism as a decimal positioning means. In a series of multiplication operations in which the products are to be accumulated in the register, the largest number of places to the right of the decimal in all of the multiplicands given will be assumed to be three, while that of the multipliers will be four. Rod 503 lying between the third and fourth orders of the keyboard is therefore rotated to its indicating position, as seen in Fig. 1, and the dial 468 is moved to indicate "4." The sum of these then determines the position of the decimal marker 502 to be between the seventh and eighth dial 21 of the register. The first multiplicant "12.34" to be used, however, has but two decimal places therein while the first multiplier "432.1" has but one place therein. Therefore, the "12" of the multiplicand is set in the fourth and fifth keyboard orders (Fig. 1) and "34" is set in the second and third orders. To enter the multiplier, the "4," "3," and "2" keys 200 are depressed in that order followed by a depression of the auxiliary key 425 and the "1" key 200 seriatim.

With the entry of the "432" into the pin carriage 201 (Fig. 13) the tooth 481 will have moved three places to the left of the position shown in Figs. 13 and 14. Thereupon the depression of key 425 rocks the bail 474 to engage the fourth notch 479 from the right, as viewed in Fig. 14, with the tooth 481. Thus, any further movement of the pin carriage 201 serves to slide the bail 474 and stepped cam 463 to the left. Since the "4" tooth of the teeth 464 on the stepped cam has been positioned by the setting of the dial 468 for abutting relation with the pin 466, the depression of the control key 250, which serves to release the escapement stop pawl 216 (Fig. 10), enables the pin carriage 201 to be shifted three ordinal steps further to the left, that is, until the "4" tooth abuts the pin 466.

Upon the operation of overstroke pawl 88 (Fig. 5) in the leftmost position of the register, the three zeros to the right of the significant multiplier factor in the operative position of the pin carriage 201 operate immediately to cause a tabulation of the register three orders to the right. The "1" in the multiplier is then in effective position to cause a single registration of the multiplicand "1234" in the register with the three dials 21 to the right of the marker 502 registering "234." Ordinal shifting of the register and the pin carriage to the right moves the "2" rack into active position, which is then effective to cause two registrations of the multiplicand in the register with a value of "25.914" indicated in the dials 21. This sequence of operations continues to the termination of multiplication when the resulting product is indicated in the dials 21 of the register as "5332.114." It is, therefore, readily apparent that upon depression of a control key 250, 251 or 252 following an operation of key 425, the number of zeros entered into the pin carriage 201 is determined by the setting of the stepped cam 463 (Fig. 13). Each zero thus entered causes the register carriage to be tabulated to the right to a position wherein the product will invariably be registered in the correct dials 21 with respect to the setting of the marker 502.

Means are provided to visually indicate the decimal point in each multiplier factor entered in the pin carriage 201. For this purpose an indicator arm 510 (Figs. 8 and 13) of any pliant material is secured to arm 476 of bail 474 in a manner such, that the free end thereof is maintained in engagement with the indicating sectors 208, however, the pressure exerted thereon is not sufficient to prevent the shifting movement of the pin carriage 201. The free end of arm 510 has a nipple 511 formed at its extremity and located thereon to lie in a position between the representative values on the sectors 208. Referring to the example used above, following the entry of "432" into the multiplier pin carriage when the key 425 is depressed to engage the bail 474 with the tooth 481 on the escapement rack, the nipple 511 will be positioned immediately to the right of the "2." Arm 510 remains in this position with respect to the sectors 208 during its subsequent shifting movement with the pin carriage 201. In the first cycle of machine operation, as described hereinbefore, when the key 425 is restored to its active position, spring 277 serves to move bail 474, cam 463, and indicator arm 510 to their inoperative positions shown in Fig. 13.

I claim:

1. In a calculating machine having a multiplier selection mechanism including a carriage, adjustable selection elements in said carriage normally in a zero indicating position, a manipulable value entering means for differentially adjusting said elements, means for shifting said carriage relative to said value entering means, and an escapement mechanism operable by said value entering means to control said shifting means for one ordinal shift of said carriage with each digital entry by said value entering means including a zero, a multiple zero mechanism comprising means for disabling said escapement mechanism and enabling said shifting means to move said carriage, a manually settable indicating means for said multiple zero mechanism, means differentially adjustable by said settable means to limit the ordinal movement of said carriage in accordance with the setting of said settable means upon operation of said disabling means, selectively operable means engageable with said carriage in any ordinally shifted position thereof for subsequent shifting movement therewith into engagement with said adjustable means, manually operable means for engaging said selectively operable means with said carriage, means conditioned by said engaging means for operation of said disabling means, a latch means for latching said engaging means and said conditioned means in an operative position, and manually operable control means operable to effect operation of said conditioned means and release of said latch means.

2. In a calculating machine having a product register, means for shifting said register, a multiplicand selection means, a multiplicand decimal representation means, a multiplying mechanism for controlling the registration of a product in said register including a shiftable multiplier carriage and carriage borne multiplier storage elements normally representing zeros operable to receive a multiplier factor, a factor entering means, escapement means for shifting said carriage rendered operable by said factor entering means with the entry of each digit including a zero, means controlled by said carriage borne elements in each shifted position thereof to control multicyclic operation of said selection means and ordinal operation of said register shifting means, a control key for initiating operation of said multiplying mechanism, and means operable upon initiation of a multiplying operation to effect a tabulation of said register relative to said decimal representation means for the accumulation of products around a fixed decimal comprising means settable to indicate an invariable decimal position in each multiplier factor in a plurality of related operations, a detent means for said indicating means operable in each set position thereof, a square shaft rotatable by said indicating means, a stepped cam slidably mounted on said shaft for movement from an inoperative to an operative position and differentially rotatable by said indicating means in accordance with the indication thereon, a spring means urging said stepped cam to an inoperative position, a stop pin mounted for cooperation with said stepped cam to determine the extent of sliding movement thereof, a tooth on said carriage, rockable means associated with said stepped cam and engageable with said tooth for movement of said cam by said carriage, a tabulation control key operable upon depression to engage said rockable means with said tooth thereby determining the subsequent shifting movement of said carriage, a latch means for said tabulation control key operative in the depressed position thereof, an arm rockable by said first-mentioned control key, a normally inoperative link engageable with said arm upon manipulation of said tabulation control key, a disabling means for said escapement means operable by said link upon rocking of said arm to release said carriage to a position determined by the engagement of the differentially rotated cam with said stop pin, a cyclically operable cam, and a normally disengaged cam follower connected to said link and engageable with said cam upon operation of said tabulation control key and operable in the first multiplying cycle to disengage said link from said arm and to release said latch means and thereby enable said spring means.

3. In a calculating machine having a shiftable product register, a multiplicand selecting means, a decimal indicating means for said multiplicand selecting means, means for ordinally shifting said register relative to said multiplicand selecting means and said decimal indicating means, a multiplying mechanism for controlling the registration of a product in said register, said mechanism including a multiplier setting means and a shiftable multiplier carriage and an escapement mechanism for effecting shifting of said carriage with the setting of each multiplier digit therein including a zero, means operable by said multiplying mechanism to shift said carriage ordinally in the opposite direction, means operable in each shifted position of said carriage to control multicyclic operation of said selecting means and to effect operation of said register shifting means during operation of said multiplying mechanism, a control key for initiating operation of said multiplying mechanism, and an automatic decimal point mechanism for said product register comprising a manual selection member for predetermining the invariable decimal position for each series of a plurality of products registered for accumulation in said register, a stepped cam differentially settable by said selection member and ordinally slidable from an inoperative to an operative position, a detent means for retaining said stepped cam in each differentially set position, spring means for urging said stepped cam to its inoperative position when moved therefrom, a pin on said carriage, a comb associated with said stepped cam for controlling the sliding movement thereof and operable to engage said pin for movement with said carriage, a decimal control key for representation of a decimal point of each multiplier factor set-up in said carriage and operable upon depression to engage said comb with said pin, a stop pin effective to check the movement of said carriage in accordance with the differential setting of said stepped cam, means to control said escapement mechanism to release said multiplier carriage for movement to a position determined by the engagement of said stepped cam with said stop pin, means operatively associated with said escapement control means and movable by said decimal control key to an operative position thereof for control by said operation control key, a latch means for retaining said associated means in an operative position, means controlled by said operation control key for effecting operation of said associated means and for initiating a multiplication operation, and a cam means operable upon depression of said operation control key to release said latch means and disengage said comb from said pin to thereby effect operation of said spring means.

4. In a calculating machine having a multiplier selection mechanism including a carriage, adjustable selection elements in said carriage normally in a zero indicating position, a manipulable value entering means for differentially adjusting said elements, means for shifting said carriage relative to said value entering means, and an escapement mechanism operable by said value entering means to control said shifting means for one ordinal shift of said carriage with each digital entry by said value entering means including a zero, a multiple zero mechanism comprising means for disabling said escapement mechanism and enabling said shifting means to move said carriage, means operable to terminate the operation of said shifting means upon operation of said disabling means, a manually settable indicating means for said multiple zero mechanism, selectively operable means engageable with said carriage in any ordinally shifted position thereof and subsequently shiftable therewith, means differentially adjustable by said settable means and operable by said selectively operable means to engage said terminating means thereby limiting the movement of said carriage in accordance with the setting of said indicating means, means for engaging said selectively operable means, and control means operable to effect operation of said disabling means.

5. In a calculating machine, a multiplier selection means, means for entering the digits of a multiplier factor into said selection means, means for setting up a representation of a decimal point for each multiplier factor during entry thereof into said multiplier selection means, means rendered operative by said setting up means to thereafter limit the said selection means to the entry of an invariable number of digits in each multiplier factor, a multiplication control key, and means controlled by said control key, upon operation thereof subsequent to the operation of said setting up means, to effect a supplemental entry of a number of zeros into said multiplier selection means as determined by said limiting means 6. In a calculating machine, a multiplier value selection means, means for shifting said value selection means, a manually operable value entering means for entering values into said selection means, an escapement mechanism operable by said value entering means to control said shifting means for one ordinal shift of said selection means with each digital entry including a zero, means for disabling said escapement mechanism and enabling said shifting means to move said selection means to an extreme position, a normally inoperative means engageable with said value selection means for subsequent movement therewith to terminate the operation of said shifting means, manually adjustable means operable to predetermine a differential shifting movement of said value selection means subsequent to the engagement of said terminating means with said selection means, an operation control key, and manipulatable means for effecting engagement of said terminating means and conditioning said disabling means for control by said operation control key.

7. In a calculating machine, a shiftable multiplier register, means for ordinarily shifting said register, a multiplier selection means for entering values into said multiplier register and effecting operation of said shifting means, means for restraining said register in each ordinally shifted position thereof, means for disabling the operation of said restraining means and enabling the operation of said shifting means to shift said register one or more orders, a control key, a decimal point means operable to condition said disabling means for operation by said control key, differentially settable means enabled by said decimal point means to determine the ordinal shifting movement of said register upon operation of said key, means for setting said settable means, means for latching said decimal point means in its operative position, and means rendered operable by said control key in timed relation to the operation of said disabling means to release said latching means.

8. In a calculating machine, a multiplier value selection means, means for shifting said value selection means, a value entering means for entering values into said selection means, an escapement mechanism operable by said value entering means to control said shifting means for one ordinal shift of said selection means with each digital entry including a zero, means for disabling said escapement mechanism and enabling said shifting means to move said selection means to an extreme position, manually adjustable means operable to predetermine a differential shifting movement of said value selection means, a normally inoperative means associated with said manually adjustable means and engageable with said value selection means to enable movement of the adjustable means with subsequent movement of said selection means, means operable subsequent to the engagement of said normally inoperative means to terminate the movement of said adjustable means and said selection means in an ordinal position determined by the adjustment of said adjustable means, a control key, and manipulatable means for effecting engagement of said normally inoperative means and conditioning said disabling means for control by said control key.

9. In a calculating machine, a decimally arranged accumulator for product registration, a decimal point indicator for said accumulator, a multiplicand selection means, a decimal point indicator for said multiplicand selection means, an actuating means for registering a value determined by said multiplicand selection means in said accumulator, means for ordinally shifting said accumulator relative to said multiplicand selection means, a plurality of ordinally arranged and differentially adjustable multiplier storage elements for receiving the digital values of a multiplier factor, a multiplier control means for controlling the actuating means to register a multiplicand in said accumulator in accordance with the digital value of an operative one of said multiplier storage elements, a feed element for returning the operative one of said storage elements to its "0" position, said storage elements and said feed element being shiftable with respect to the other, shifting mechanism for shifting the shiftable one of said elements, a manual means for differentially adjusting said storage elements and operate the shifting mechanism to shift the shiftable one of said elements an increment in one direction, means rendered operative by the return of the operative one of said multiplier storage elements to its "0" position to enable said shifting means and said shifting mechanism to shift the siftable element an increment in the other direction, means for setting up a representation of a decimal point of a multiplier factor during operation of said manual means, a differentially adjustable means rendered operable by said setting-up means to predetermine the number of operations of said manual means to an invariable number of operations thereafter, means for adjusting said adjustable means, a control key for initiating operation of said control means, and means controlled by the operation of said key subsequent to the operation of the manual means for causing the operation of said shifting mechanism a number of increments corresponding to the difference between the number of operations of said manual means subsequent to the operation of the set-up means and said invariable number.

10. In a calculating machine having an accumulator and an actuating means therefor, means for ordinally shifting said accumulator relative to said actuating means, a multiplier selection mechanism including a normally inoperatively positioned carriage, a plurality of ordinally arranged carriage borne selection elements normally representing "0," means for adjusting said elements to represent the digits of a factor, means for shifting said carriage from the inoperative to an operative ordinal position simultaneously with the adjustment of the element to represent a digit, means for shifting said carriage in the opposite direction, means for restoring the element in the operative ordinal position to "0" representing position when displaced therefrom, an operational control key for initiating operation of said restoring means, and means controlled by the element in the operative ordinal position of said carriage for effecting operation of said actuating means upon operation of said restoring means and, upon registration of "0," to control said accumulator shifting means and said carriage shifting means to shift said carriage in the opposite direction, a tabulating control mechanism for said accumulator comprising an adjustable means connectable to said carriage in any ordinal position thereof and thereafter shiftable therewith, a manually settable means operable to differentially adjust said adjustable means, a manually operable means for connecting said adjustable means with said carriage, means cooperating with said adjustable means and operable to terminate the shifting movement of said carriage in a position determined by the differential adjustment of said adjustable means subsequent to the operation of said manually operable means, and means rendered operable by said control key to enable said carriage shifting means to move said carriage to an operative ordinal position in accordance with the setting of said settable means, thereby rendering said carriage operable to effect operation of said accumulator shifting means to move said accumulator ordinally in accordance with said setting.

11. In a calculating machine, a register for the accumulation of decimalized product registrations, a decimal indicator for said register, an actuating means therefor, means for shifting said register relative to said actuating means, a multiplicand selection means, a decimal representation means for said multiplicand selection means, a multiplier mechanism for controlling operation of said actuating means and said shifting means to enter a product into said register, said mechanism including shiftable ordinally arranged multiplier value members and escapement means for effecting shifting of said members, value selection means for entering the ordinal digits of a multiplier factor including zeros into said multiplier value members and operating said escapement means, means for setting up a representation of a decimal point for each multiplier factor entered in said multiplier value members, a multiplication control key, manually operable means differentially settable to limit operation of said escapement means to an invariable number of operations of said value selection means subsequent to the operation of said setting-up means, and means rendered operative by said setting-up means for control by said control key, upon operation thereof, to effect operation of said escapement means for controlling the entry of a limited number of zeros into said multiplier value members corresponding to the difference between the number of operations of said value selection means subsequent to operation of said setting-up means and said invariable number.

12. In a calculating machine having a shiftable product register, a multiplicand selecting means, a decimal indicating means for said multiplicand selecting means, means for ordinally shifting said register relative to said multiplicand selecting means and said decimal indicating means, a multiplying mechanism for controlling the registration of a product in said register, said mechanism including a multiplier setting means, a shiftable multiplier carriage and an escapement mechanism for effecting shifting of said carriage with the setting of each multiplier digit therein including a zero, means operable by said multiplying mechanism to shift said carriage ordinally in the opposite direction, means operable in each shifted position of said carriage to control multicyclic operation of said selecting means and to effect operation of said shifting means during operation of said multiplying mechanism, a control key for initiating operation of said multiplying mechanism, and an automatic decimal point mechanism for said product register comprising a manual selection member for predetermining an invariable decimal position for each series of a plurality of products registered for accumulation in said register, a stepped cam differentially settable by said selection member, a detent means for retaining said stepped cam in each differentially set position, a tooth on said carriage, a comb means operatively connectable to said carriage and positionable to engage said tooth for movement of said comb with said carriage, a decimal control key for representation of a decimal point of each multiplier factor set-up in said carriage and operable upon depression to engage said comb with said tooth, means for controlling said escapement mechanism to release said multiplier carriage for movement, a normally inoperative stop member associated with said cam and said comb for stopping said carriage in a position determined by the differentially set position of said stepped cam, means operatively associated with said escapement control means and movable by said decimal control key to an operative position thereof for control by said operation control key, a latch means for retaining said associated means in an operative position, means controlled by said operation control key for effecting operation of said associated means and initiating a multiplication operation, and a cam means operable upon depression of said operation control key to release said latch means in the first multiplication cycle.

References Cited in the file of this patent

UNITED STATES PATENTS

| | | |
|---|---|---|
| 829,357 | Stroh | Aug. 21, 1906 |
| 1,018,510 | McCaskey | Feb. 27, 1912 |
| 1,145,599 | Landsiedel | July 6, 1915 |
| 1,707,303 | Greve | Apr. 2, 1929 |
| 1,911,515 | Koronski | May 30, 1933 |
| 2,042,909 | Satukangas | June 2, 1936 |
| 2,058,922 | Stickney | Oct. 27, 1936 |
| 2,061,362 | Lentz | Nov. 17, 1936 |
| 2,376,997 | Friden | May 29, 1945 |
| 2,467,419 | Avery | Apr. 19, 1949 |
| 2,630,967 | Swanson et al. | Mar. 10, 1953 |
| 2,645,422 | Pfleger | July 14, 1953 |
| 2,647,690 | Anderson | Aug. 4, 1953 |
| 2,702,159 | Reppert | Feb. 15, 1955 |
| 2,702,668 | Dustin | Feb. 22, 1955 |

UNITED STATES PATENT OFFICE
CERTIFICATE OF CORRECTION

Patent No. 2,868,453                                        January 13, 1959

Grant C. Ellerbeck

It is hereby certified that error appears in the printed specification of the above numbered patent requiring correction and that the said Letters Patent should read as corrected below.

Column 2, line 34, for "30-30" read -- 20-20 --; column 3, line 46, for "cylindrers" read -- cylinders --; column 6, line 29, after "left" insert -- end --; line 50, for "or resetting" read -- of resetting --; column 7, line 49, for "multiplied" read -- multiplier --; line 68, after "Fig. 8," insert -- and --; column 16, line 6, for "than" read -- that --; line 33, for "pawel" read -- pawl --; column 17, line 3, for "multiplaction" read -- multiplication --; line 46, for "is", second occurrence, read -- its --; column 18, line 48, for "Fig." read -- Figs. --; column 19, line 38, for "498" read -- 489 --; column 22, line 39, for "multiplicant" read -- multiplicand --; column 25, line 51, after "means", second occurrence, insert a period.

Signed and sealed this 14th day of July 1959.

(SEAL)
Attest:

KARL H. AXLINE                                                                 ROBERT C. WATSON
Attesting Officer                                                         Commissioner of Patents